United States Patent
Echizen et al.

(10) Patent No.: US 6,650,763 B2
(45) Date of Patent: Nov. 18, 2003

(54) METHOD OF EXTRACTING DIGITAL WATERMARK INFORMATION AND METHOD OF JUDGING BIT VALUE OF DIGITAL WATERMARK INFORMATION

(75) Inventors: Isao Echizen, Yokohama (JP); Hiroshi Yoshiura, Tokyo (JP); Yutaka Kurosu, Yokohama (JP); Kousuke Anzai, Fujisawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/252,415

(22) Filed: Sep. 24, 2002

(65) Prior Publication Data

US 2003/0021444 A1 Jan. 30, 2003

Related U.S. Application Data

(63) Continuation of application No. 09/523,523, filed on Mar. 10, 2000, now Pat. No. 6,456,727, which is a continuation-in-part of application No. 09/388,447, filed on Sep. 2, 1999.

(30) Foreign Application Priority Data

| Sep. 2, 1999 | (JP) | ............ 11-248370 |
| Nov. 19, 1999 | (JP) | ............ 11-329216 |

(51) Int. Cl.[7] .............................. G06K 9/00
(52) U.S. Cl. ............................ 382/100; 713/176
(58) Field of Search ................. 382/100, 135, 382/284, 232; 380/243, 202, 252, 201, 59, 28, 51, 54; 359/2; 235/469

(56) References Cited

U.S. PATENT DOCUMENTS

| 5,486,928 A | * | 1/1996 | Doublet et al. ............. 700/187 |
| 5,636,292 A | | 6/1997 | Rhoads |
| 5,664,018 A | * | 9/1997 | Leighton ..................... 380/54 |
| 5,687,236 A | * | 11/1997 | Moskowitz et al. ......... 380/28 |
| 5,930,369 A | * | 7/1999 | Cox et al. ..................... 380/54 |
| 5,949,055 A | * | 9/1999 | Fleet et al. .................. 235/469 |
| 6,037,984 A | * | 3/2000 | Isnardi et al. ........... 375/240.21 |
| 6,104,826 A | | 8/2000 | Nakagawa et al. ......... 382/100 |
| 6,108,434 A | * | 8/2000 | Cox et al. ................... 382/100 |
| 6,400,826 B1 | * | 6/2002 | Chen et al. ................. 382/100 |
| 6,418,232 B1 | * | 7/2002 | Nakano et al. ............. 382/100 |

OTHER PUBLICATIONS

"Data Hiding Based on Neighbor Pixels Statistics" by Kobayashi, et al, In Proc., of IPSJ 56th Annual Conference, IV–03, (1998), pp. 3–37–38. (Discussed in the specification).

* cited by examiner

Primary Examiner—Jayanti K. Patel
Assistant Examiner—Seyed Azarian
(74) Attorney, Agent, or Firm—Antonelli, Terry, Stout & Kraus, LLP

(57) ABSTRACT

A digital watermark information is extracted from geometrically deformed image without using a calibrating digital watermark. Pixel data at positions predetermined in an X-Y coordinate used when embedding the watermark is extracted from image data in which the digital watermark has been embedded for given pixel data and compared with a reference value to determine whether the watermark has been embedded in the pixel data concerned or not. This processing is repeated until it is confirmed that the information is embedded in the pixel data concerned, while applying geometric deformation to the image data.

6 Claims, 21 Drawing Sheets

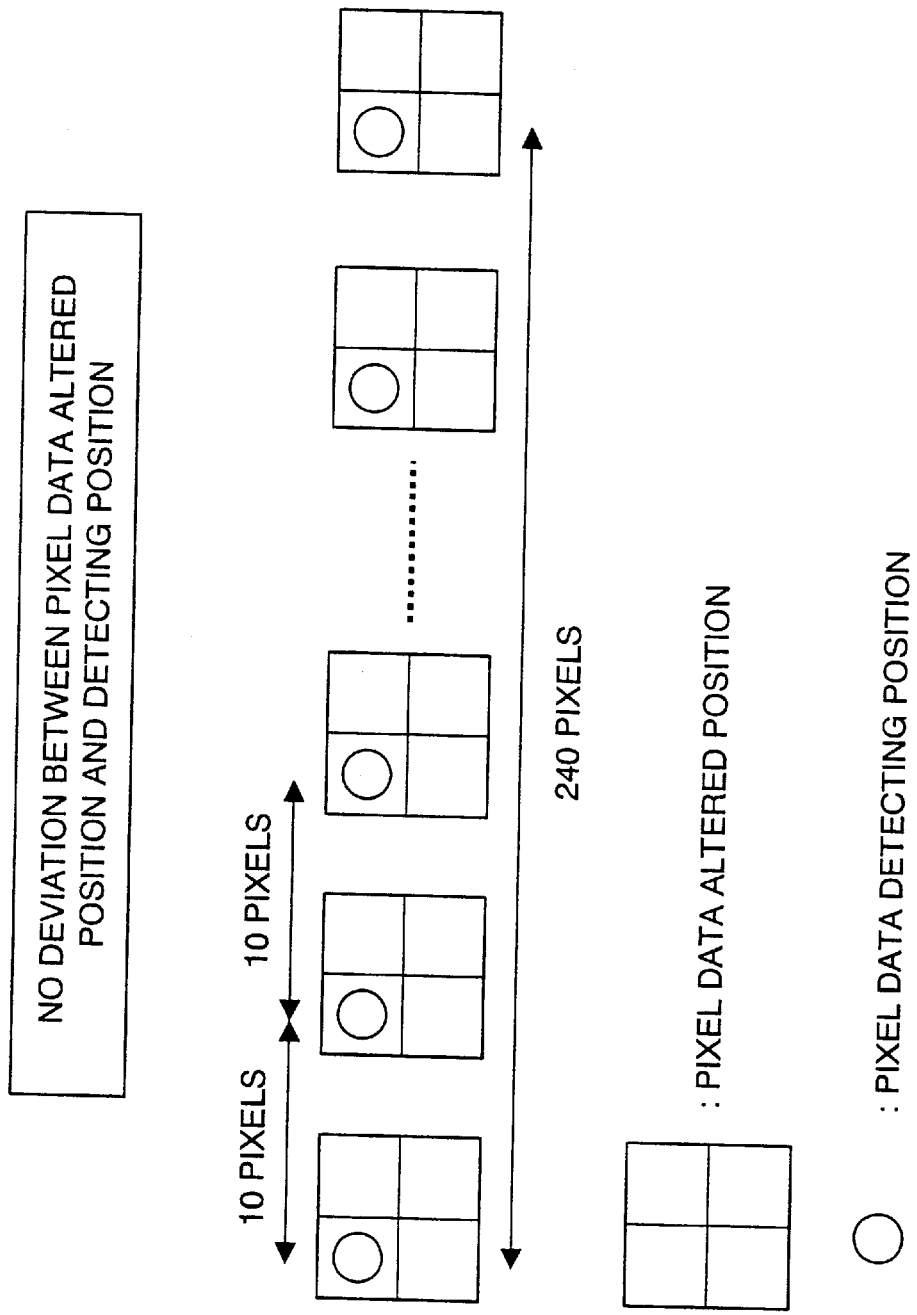

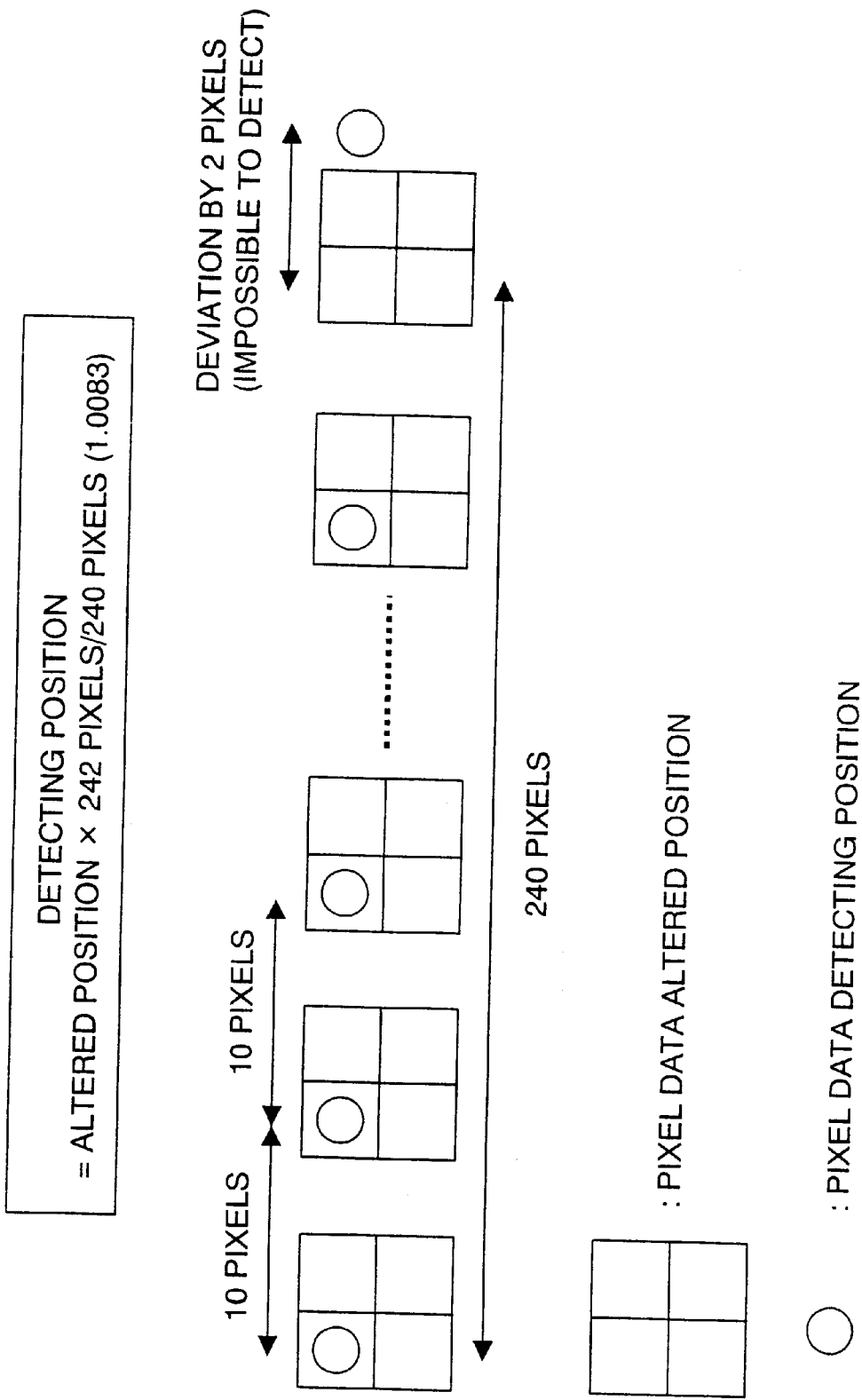

METHOD OF EXTRACTING DIGITAL WATERMARK INFORMATION AND METHOD OF JUDGING BIT VALUE OF DIGITAL WATERMARK INFORMATION

The present application is a continuation of application Ser. No. 09/523,523, filed Mar. 10, 2000, now U.S. Pat. No. 6,456,727, which is a continuation-in-part of application Ser. No. 09/388,447, filed on Sep. 2, 1999, entitled "METHOD OF EXTRACTING DIGITAL WATERMARK INFORMATION AND METHOD OF JUDGING BIT VALUE OF DIGITAL WATERMARK,"., the contents of which are incorporated herein by reference.

BACKGROUND OF THE INVENTION

1. Field of the Invention

The present invention relates to a digital watermark technique for digital data, particularly image data.

2. Description of Related Art

Recently, from the viewpoint of copyright protection for digital data such as image data, etc., much attention is being paid to a digital watermark technique. The digital watermark technique is defined as a technique of embedding specific information into digital data according to a predetermined rule so that the specific information cannot be extracted from the digital data without using at least the predetermined rule. According to this technique, for example, information on a purchaser of image data, etc. is beforehand embedded in the image data itself according to the predetermined rule in such a manner that the information is not visible, and when the image data are illegally copied, the embedded information is extracted according to the predetermined rule from the data thus illegally copied to specify a person (purchaser) who illegally copies the data.

FIG. 18 is a diagram showing the principle of information embedding/extracting processing into/from image data on the basis of a conventional digital watermark technique.

With respect to the information embedding processing, as shown in FIG. 18, when a bit $b_i$ ($0 \leq i \leq n$) of bits $b_1$ to $b_n$ constituting information to be embedded is equal to 1, the bright of each of pixel data located at predetermined positions 1 to m of the image data is increased by U, and when the bit $b_i$ is equal to zero, the brightness of each pixel data is reduced by U. This processing is carried out on all the bits $b_1$ to $b_n$ while the embedding position is shifted, thereby embedding the digital watermark information in the image data.

With respect to the processing of extracting the digital watermark information thus embedded, for the bit $b_i$ ($0 \leq i \leq n$) of bits $b_1$ to $b_n$ constituting the information thus embedded, the brightness sum S of all the pixel data located at the predetermined positions 1 to m of the image data and the brightness sum R (Reference value) of all the pixel data located adjacently to the predetermined positions 1 to m are detected. If $S-R \geq T$ (here, T is varied in accordance with a demanded error rate, and it is set to satisfy $T \geq U \times$(the number m of pixel data in which $b_i$ is embedded)), it is judged that $b_i$ is equal to 1. If $S-R \leq -T$, it is judged that $b_i$ is equal to zero. If $-T<S-R<T$, it is judged that no information is embedded in each of the pixel data located at the predetermined positions 1 to m. This processing is carried out on all the bits $b_1$ to $b_n$ to extract the digital watermark information in the image data.

The digital watermark technique is described in more detail in Kobayashi, et al.: Data Hiding Based on Neighbor Pixels Statistics, *In Proc. of IPSJ 56th Annual Conference,* 1V-03, (1998).

When a geometrical deformation such as scale-up/scale-down or rotation is applied to image data in which digital watermark information as described above is embedded, the embedding positions of the bit data constituting the digital watermark information (the positions on the X-Y coordinate used when the bit data are embedded) are also deformed. Therefore, the digital watermark information cannot be extracted. A technique to overcome the above problem is disclosed in U.S. Pat. No. 5,636,292.

According to this technique, as shown in FIG. 19, a calibrating digital watermark for estimating what geometrical deformation is applied to the image data, that is, what scale-up/scale-down or rotation processing is applied to the image data in addition to the digital watermark information such as copyright information or the like, is beforehand embedded in the image data concerned. When the digital watermark information is extracted, the calibrating digital watermark information is extracted from the image data, and the degree of the deformation is analyzed, thereby estimating the scale-up/scale-down degree or the rotational angle applied to the image data concerned. Subsequently, the image data concerned are returned to the original image data (the image data before the geometrical deformation is applied) by referring to the scale-up/scale-up rate or the rotational angle thus estimated. Thereafter, the pixel data located at a predetermined position and the adjacent pixel data are extracted, and the differential value (S−R) therebetween is compared with a predetermined threshold value to extract the digital watermark information.

SUMMARY OF THE INVENTION

However, in the conventional method using the calibrating digital watermark as described above, not only digital watermark information such as copyright information, etc. which are to be originally embedded, but also a calibrating digital watermark are embedded in image data, and thus this method has a problem that a great effect is imposed on the image quality.

Therefore, a first object of the present invention is to provide a digital watermark technique which can specify a digital watermark information embedding position from geometrically-deformed image data without using any calibrating digital watermark.

Further, in the above conventional method of judging the bit value of the digital watermark information, for a bit $b_i$ ($0 \leq i \leq n$) of bits $b_1$ to $b_n$ constituting digital watermark information, the brightness sum S of all the pixel data located at the predetermined positions 1 to m of the image data and the brightness sum R (Reference value) of all the pixel data located adjacently to the predetermined positions 1 to m are detected. If $S-R \geq T$, it is judged that $b_i=1$. If $S-R \leq -T$, it is judged that $b_i$=zero. If $-T<S-R<T$, it is judged that no information is embedded in each of the pixel data located at the predetermined positions 1 to m.

Here, a predetermined value is usually used as the threshold value T. However, when the threshold value T is not optimized to the image data from which the digital watermark information is extracted, $-T<S-R<T$ is established although the bit $b_i$ constituting the digital watermark information is embedded to predetermined positions 1 to m of the image data, and thus it may be judged that no information is embedded in the predetermined positions 1 to m. That is, the extraction sensitivity of the bits constituting the digital watermark information is lowered.

On the other hand, if the extraction sensitivity of the bits constituting the digital watermark information is increased by setting the threshold value T to a lower value in advance, for some image data from which the digital watermark information is extracted, the bit value judgment error of the bits constituting the digital watermark information extracted from the image data is increased, so that the bit value judgment precision is degraded. Therefore, the bit value of the digital watermark information extracted from the image data cannot be relied on.

Therefore, a second object of the present invention is to provide a digital watermark technique which can grasp whether the bit value of digital watermark information extracted can be relied on even when the extraction sensitivity of the bits constituting the digital watermark information is increased.

In order to attain the first object, according to a first aspect of the present invention, a method of extracting digital watermark information from image data which has the digital watermark information embedded therein by altering at least one pixel data located at a predetermined position on a specific coordinate and is geometrically deformed, comprises an embedding position check step of executing the processing of extracting at least one pixel data at a predetermined position on the specific coordinate from the image data and comparing the data value thus extracted with a reference value to judge whether the information is embedded in the pixel data while applying the geometrical deformation on the image data until it is confirmed that the information is embedded in the pixel data.

Here, the geometrical deformation means a reversible deformation such as scale-up/scale-down or rotation, that is, it means that deformed data can be restored to original image data before the deformation. Further, the reference value may be the data value of pixel data located in the vicinity of the extracted pixel data or the data value of the extracted pixel data which is interpolatively estimated by using at least two pixel data located in the vicinity of the extracted pixel data. Further, "until it is checked that the information is embedded in the pixel data" specifically means "until the image data which is subjected to the geometrical deformation so that the differential value (absolute value) between the data value of the extracted pixel data and the reference value is maximum is detected".

According to the first aspect of the present invention, a series of processing of extracting from the image data the pixel data located at the embedding position specified by a specific coordinate and comparing the data value of the pixel data concerned with the reference value to judge whether the information is embedded in the pixel data concerned is executed while applying the geometrical deformation on the image data until it is checked that the information is embedded in the pixel data. For example, the image data is rotated at a rotational angle, and then, it is checked whether the information is embedded in the pixel data while further the image data concerned is scaled up/scaled down by a predetermined magnification. If it is not checked that the information is embedded in the pixel data, the image data is rotated at another rotational angle and then the same processing is carried out. This processing is repetitively executed until it is checked that the information is embedded in the pixel data.

With the above operation, without the calibrating digital watermark, the position at which the digital watermark information is embedded can be specified from the geometrically-deformed image data.

In the first aspect of the present invention, the embedding position check step may comprise the following roughly checking step and detailed checking step. In the roughly checking step, the processing of extracting from the image data at least one pixel data located at a predetermined position on the specific coordinate and comparing the data value thus extracted with the reference value to judge whether the information is embedded in the pixel data concerned is carried out while the geometrical deformation is applied to the image data by every first geometrical deformation rate until it is confirmed that the information is embedded in the pixel data concerned. In the detailed checking step, the processing of extracting from the image data at least one pixel data located at a predetermined position on the specific coordinate and comparing the data value thus extracted with the reference value to judge whether the information is embedded in the pixel data concerned is carried out while the geometrical deformation is applied to the image data by every second geometrical deformation rate smaller than the first geometrical deformation rate within a predetermined range containing the geometrical deformation rate when it is checked in the roughly checking step that the information is embedded in the pixel data until it is confirmed that the information is embedded in the pixel data concerned.

Further, in the first aspect of the present invention, when the digital watermark information is embedded in the image data by altering at least one pixel data located at a predetermined position on a specific coordinate for each of plural bit data constituting the digital watermark information, the embedding position check step may be carried out on at least one bit data of the plural bit data, whereby the plural bit data are extracted from the image data which are subjected to the geometrical deformation when the pixel data having the bit data concerned embedded therein is confirmed.

With the above operation, the check of the pixel data having the digital watermark information embedded therein can be more efficiently performed.

In order to attain the first object, according to a second aspect of the present invention, a method of extracting digital watermark information from image data which has the digital watermark information embedded therein by altering at least one pixel data located at a predetermined position on a specific coordinate and is geometrically deformed, comprises an embedding position check step of executing the processing of extracting at least one pixel data located at a predetermined position on the specific coordinate and comparing the data value thereof with a reference value to judge whether the information is embedded in the pixel data concerned while varying the predetermined position on the image data by deforming the specific coordinate until it is confirmed that the information is embedded in the pixel data concerned.

According to the second aspect of the present invention, a series of processing of extracting from the image data the pixel data located at the embedding position of the digital watermark information specified by the specific coordinate and then comparing the data value of the pixel data concerned with the reference value to judge whether the information is embedded in the pixel data concerned is executed while deforming the specific coordinate until it is confirmed that the information is embedded in the pixel data. For example, the specific coordinate is rotated at a rotational angle, and then, it is checked whether the information is embedded in the pixel data while scaled up/scaled down by a predetermined magnification. If the embedding of the information is not confirmed, the specific coordinate is rotated at another rotational angle, and then, the same processing is carried out. This processing is repetitively carried out until it is confirmed that the information is embedded in the pixel data.

With the above operation, the digital watermark information can be extracted from the geometrically-deformed image data without using any calibrating digital watermark. Further, according to the second aspect of the present invention, the embedding position of the digital watermark information can be checked without applying any geometrical deformation on the image data itself, so that the memory capacity needed for the processing and the load of the processor can be reduced to be less than these of the first aspect of the present invention.

Further, in the second aspect of the present invention, the embedding position check step may comprise the following roughly checking step and detailed checking step. In the roughly checking step, the processing of extracting from the image data at least one pixel data located at a predetermined position on the specific coordinate and comparing the data value thus extracted with the reference value to judge whether the information is embedded in the pixel data concerned is carried out while the predetermined position on the image data is varied by deforming the specific coordinate by every first deformation rate until it is confirmed that the information is embedded in the pixel data concerned. In the detailed checking step, the processing of extracting from the image data at least one pixel data located at a predetermined position on the specific coordinate and comparing the data value thus extracted with the reference value to judge whether the information is embedded in the pixel data concerned is carried out while the predetermined position on the image data is varied by deforming the specific coordinate by every second deformation rate smaller than the first deformation rate within a predetermined range containing the deformation rate when it is confirmed in the roughly checking step that the information is embedded in the pixel data until it is confirmed that the information is embedded in the pixel data concerned.

The first and the second deformation rate is determined, in some cases, according to the embedding positions in the image data of the watermark information, namely, a pattern of the watermark. With some pattern, the embedded watermark information can be detected, even when the rate of the deformation given to the image data having the watermark embedded therein is not the same as the deformation rate of the image data or the deformation rate of the coordinate for detecting the embedded information from the image data. In such a case, even when the first and the second deformation rate is made larger, there may still be a high possibility that the embedded information is detected from the image data. Or, when the first deformation rate is made larger and the second deformation rate is made smaller, there may still be a high possibility that the embedded information is detected from the image data.

Therefore, in the case where the alteration of the pixel data effected due to the embedding of the watermark information is made by a unit of a pixel block larger than 1×1 and the roughly checking step is conducted such that one of the pixels of the pixel block is detected, the first deformation rate can be larger.

FIGS. 20 and 21 are schematic diagram showing the positional relationship between the positions in the image data where pixel data are altered due to the embedded information and the detecting positions to detect pixel data concerned which are determined by the coordinate deformation for detection. The alteration of the pixel data due to the embedded information is made by a block unit of 2×2 at 24 positions with a pitch of 10 pixels. In FIG. 20, there is no deviation between the positions where the altered pixel data are located and the detecting positions to detect the altered pixel data. All the 24 detecting positions overlap with the positions subjected to the alteration, respectively. In this case, the embedded information can be detected correctly. On the other hand, in FIG. 21, there is a deviation between the alteration positions in the image data and the detection positions for the image data. In total, there is a deviation of two pixels in the length of 240 pixels. FIG. 21 shows the case where the detection coordinate is scaled up by 242/240=1.0083 with respect to the image data. When the deformation rate is increased to that scale, the embedded information cannot be detected at one of the 24 positions and detection failure is caused. To solve this problem, the scale or the deformation rate may be lowered to less than 1.0083. When the size of the pixel block subjected to the alteration is enlarged from 2×2 to 4×4, the deformation rate may be as rough as 244/240=1.0167, still ensuring the detection of the embedded information.

More specifically, when the size of the pixel block is selected to be P×P and N positions are subjected to the alteration with a pitch of D pixels, the first deformation rate may be increased upto (DN+P)/(DN)=1+P/(DN), still ensuring the detection of the embedded information in the roughly checking step.

Although the detection in terms of coordinate scaling-up/down is mentioned as an example in the above, the coordinate rotation or the scaling-up/down or rotation of the image data itself can also be employed.

In the second aspect of the present invention, when the digital watermark information is embedded in the image data by altering at least one pixel data located at a predetermined position on a specific coordinate for each of plural bit data constituting the digital watermark information, the embedding position check step may be carried out on at least one bit data of the plural bit data, whereby the plural bit data are extracted by using the deformation-applied specific coordinate when the pixel data having the bit data concerned embedded therein is confirmed.

With the above operation, the check of the embedding position of the digital watermark information can be more efficiently performed.

Further, in the second aspect of the present invention, it may be adopted that when the digital watermark information is embedded in the image data by altering at least one pixel data located at a predetermined position on a specific coordinate for each of plural bit data constituting the digital watermark information, the embedding position checking step is carried out on at least one bit data of the plural bit data, a geometrical deformation is applied to the image data at the geometrical deformation rate corresponding to the deformation rate applied to the specific coordinate when the pixel data having the bit data concerned embedded therein is confirmed, and the plural bit data are extracted from the geometrically-deformed image data by using the specific coordinate before the deformation in the embedding position checking step.

Usually, when image data are scaled down, any pixel data is removed from the image data according to the scale-down rate of the image data to reduce the size of the image data. Therefore, when the scale-down processing is carried out on image data having digital watermark information embedded therein, pixel data having (a part of) the digital watermark information may be removed from the image data concerned in the scale-down processing. In such a case, the overall digital watermark information may not be efficiently extracted from the image data concerned.

Therefore, as described above, the embedding position checking step is carried out on at least one bit data of plural bit data constituting the digital watermark information to check the pixel data having the bit data concerned embedded therein. If the pixel data is confirmed, the image data are scaled up with the scale-up rate corresponding to the scale-down rate of the coordinate when the pixel data is confirmed, thereby returning the size of the image data to the original size (the size before the scale-down processing is carried out). Accordingly, pixel data which are lost due to the scale-down processing are restored and the plural bit data constituting the digital watermark information are extracted to thereby enhance the detection precision.

In order to attain the second object, according to a third aspect of the present invention, a bit value judgment method of judging a bit value of digital watermark information embedded in image data in which the digital watermark information is embedded by altering at least one pixel data located at a predetermined position on a specific coordinate for each of plural bit data constituting the digital watermark information, comprises: an error rate calculation step of calculating, for each of at least two bit data of plural bit data constituting the digital watermark information, the differential value between pixel data in which the bit data concerned is to be embedded and a reference value, and determining, on the basis of a probability distribution curve settled by the distribution of the differential values thus calculated, a bit value judgement error rate of the plural bit data when a threshold value used for the bit value judgment of the bit data is represented by T; and a bit value judgment step of comparing, for each of the plural bit data constituting the digital watermark information, the threshold value T and the differential value between pixel data in which the bit data concerned is to be embedded and the reference value when the judgment error rate calculated in the error rate calculation step is smaller than a predetermined value, thereby judging the bit value (0 or 1) of the bit data concerned.

Here, the probability distribution curve settled by the distribution of the differential values may be calculated from a statistic value such as the average value or dispersion value of the differential values obtained for each of at least the two bit data of the plural bit data constituting the digital watermark information, or a histogram of the differential values.

The bit value judgment error rate of the bit data concerned when the threshold value used for the bit value judgment of the bit data is represented by T may be calculated as the occupational rate of a part located within the range from −T to T to the overall probability distribution curve settled by the distribution of the differential values.

According to the third aspect of the present invention, prior to the bit value judgment of the digital watermark information embedded in the image data, the bit value judgment error rate of the digital watermark information embedded in the image data concerned when the threshold value used for the bit value judgment is represented by T is calculated, and only when the calculation result is smaller than a predetermined value, the bit value judgment of the digital watermark information embedded in the image data concerned is carried out by using the threshold value T. Therefore, even when the threshold value T used for the bit value judgment is set to a low value to increase the extraction sensitivity of the bits constituting the digital watermark information, the reliability of the bit value of the digital watermark information thus extracted can be ensured.

Further, in order to attain the second object, according to a fourth aspect of the present invention, a bit value judgment method of judging a bit value of digital watermark information embedded in image data in which the digital watermark information is embedded by altering at least one pixel data located at a predetermined position on a specific coordinate for each of plural bit data constituting digital watermark information, comprises: an error rate calculation step of calculating, for each of at least two bit data of plural bit data constituting the digital watermark information, the differential value between pixel data in which the bit data concerned is to be embedded and a reference value, and determining, on the basis of a probability distribution curve settled by the distribution of the differential values thus calculated, a bit value judgement error rate of the plural bit data when a threshold value used for the bit value judgment of the bit data is represented by T; a bit value judgement step of comparing, for each of the plural bit data constituting the digital watermark information, the threshold value T with the differential value between pixel data in which the bit data concerned is to be embedded and the reference value, thereby judging the bit value (0 or 1) of the bit data concerned; and an output step of outputting the bit values of the plural bit data constituting the digital watermark information judged in the bit value judgment step together with the bit value judgment error rate calculated in the error rate calculation step.

According to the fourth aspect of the present invention, the bit value judgment result of the digital watermark information embedded in the image data is output together with the bit value judgment error rate for the threshold value T used for the bit value judgment of the digital watermark information embedded in the image data. Accordingly, when the threshold value T used for the bit value judgment is set to a low value to increase the extraction sensitivity of the bits constituting the digital watermark information, it can be grasped how degree the reliability of the bit value of the digital watermark information thus extracted is.

In the third and fourth aspects of the present invention, when the threshold value T is set to zero, in the bit value judgment of the digital watermark information, by checking, for each of the plural bit data constituting the digital watermark information, whether the differential value between pixel data in which the bit data concerned is to be embedded therein and the reference value is positive or negative, the bit value (0 or 1) of the bit data concerned is judged. That is, by setting the threshold value T for the bit value judgment to zero, the judgment of 0 or 1 is necessarily made for each of the plural bit data constituting the digital watermark information embedded in the image data, thereby maximizing the extraction sensitivity of the bits constituting the digital watermark information.

In this case, in the error judgment step, for each of at least two bit data of the plural bit data constituting the digital watermark information, the differential value between the pixel data in which the bit data concerned is to be embedded and the reference value is calculated, and at least two differential values thus calculated are classified into two subsets on the basis of the judgement as to whether the differential value is positive or negative, and two probability distribution curves are determined on the basis of the distribution of the differential values contained in each of the two subsets. The bit value judgment error rate can be calculated by checking the rate of the negative part in the probability distribution curve of the positive subset and/or the rate of the positive part in the probability distribution curve of the negative subset.

In order to attain the first and second objects, according to a fifth aspect of the present invention, the digital watermark extraction method of the first or second aspect of the present invention is combined with the bit value judgment method of the digital watermark information of the third or fourth aspect of the present invention. That is, the embedding position of each bit constituting the digital watermark information embedded in the image data is specified by the digital watermark extraction method of the first or second aspect, and the bit value judgment of the digital watermark information is carried out on the image data for which the embedding position of each bit constituting the digital watermark information as described above is specified, by the bit value judgment method of the digital watermark information of the third or fourth aspect of the present invention.

Here, a device for executing the digital watermark extraction method of the first or second aspect and a device for executing the bit value judgment method of the digital watermark information of the third or fourth aspect may be the same, or may be separate and independent devices.

The error rate judgment step of the third to fifth aspects of the present invention may be applied to a case where it is merely judged whether watermark information is embedded in image data. That is, according to a sixth aspect of the present invention, a digital-watermark-information presence or absence judging method of judging whether digital watermark information is embedded in image data by altering at least one pixel data located at a predetermined position on a specific coordinate in the image data for each of plural bit data constituting the digital watermark information, comprises a step of calculating, for each of at least two bit data of plural bit data constituting the digital watermark information, the differential value between pixel data in which the bit data concerned is to be embedded and a reference value, and a step of judging it on the basis of a probability distribution curve settled by the distribution of the differential values thus calculated whether the digital watermark information is embedded.

BRIEF DESCRIPTION OF THE DRAWINGS

FIG. 20 is a schematic diagram showing the case in which the positions in the image data where pixel data are altered due to embedding of the watermark information are not deviated from the detecting positions for detecting the pixel data concerned; and FIG. 21 is a similar schematic diagram showing the case in which the positions where the pixel data are altered due to the embedding of the watermark information are deviated from the detecting positions for detecting the pixel data concerned.

DETAILED DESCRIPTION OF THE PREFERRED EMBODIMENTS

Preferred embodiments according to the present invention will be described hereunder with reference to the accompanying drawings.

First, a first embodiment of the present invention will be described.

In this embodiment, digital watermark information is embedded in image data by altering at least one pixel data located at a predetermined position on a specific X-Y coordinate, and the image data are subjected to a geometrical deformation. The processing of extracting at least one pixel data located at a predetermined position on the specific X-Y coordinate from the image data which are embedded with the digital watermark mark and geometrically deformed and then comparing the data value of the pixel data thus extracted with a reference value to judge whether information is embedded in the pixel data concerned is executed while the geometrically deformation is applied to the image data until it is confirmed that the information is embedded in the pixel data concerned.

First, prior to the detailed description of a digital watermark information extraction device to which the first embodiment of the present invention is applied, the principle of digital watermark information extracting processing of this embodiment will be described.

Figure 1:
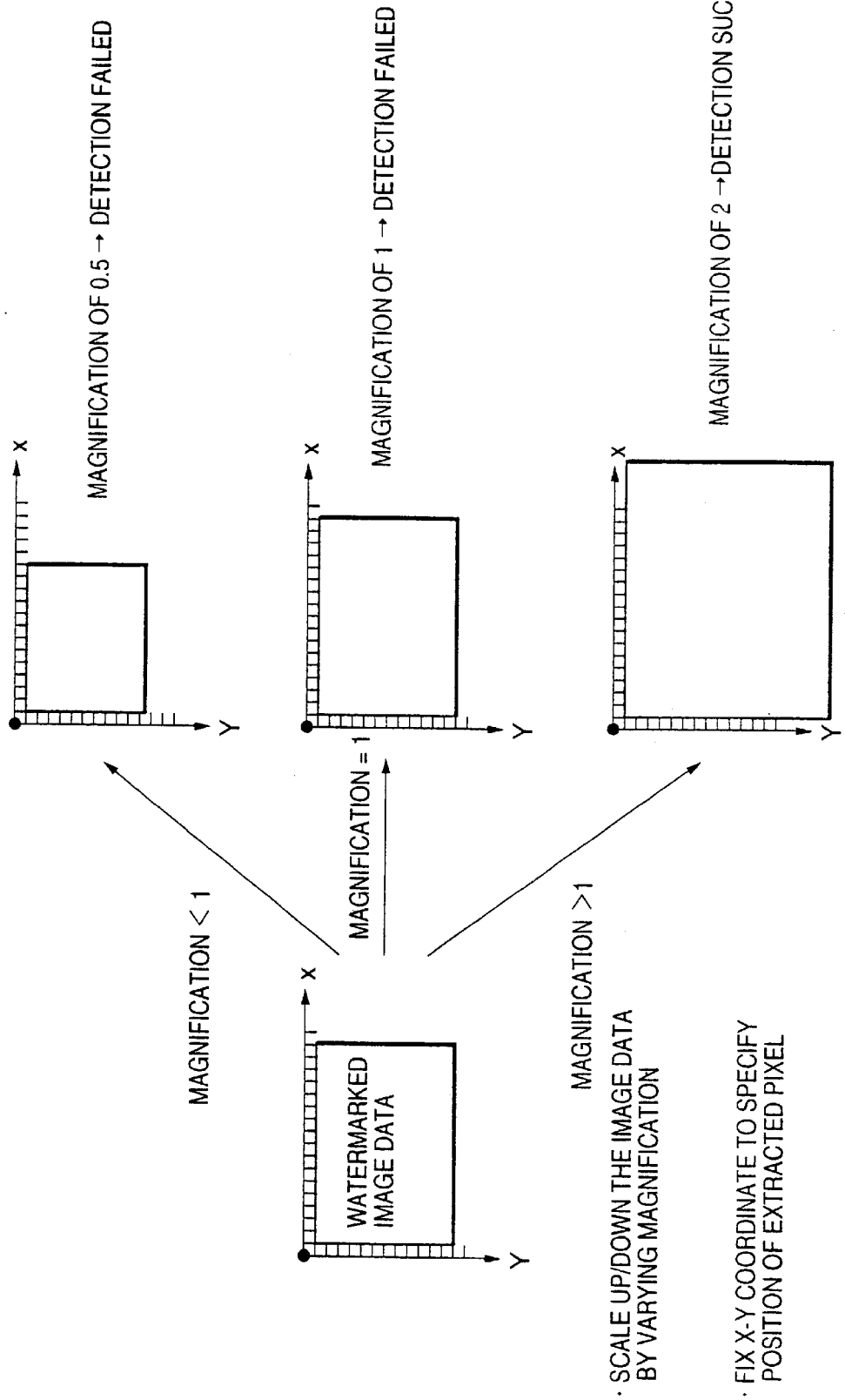
FIG. 1 is a diagram showing the principle of extraction processing of extracting digital watermark information from image data according to a first embodiment of the present invention.
Figure 2:
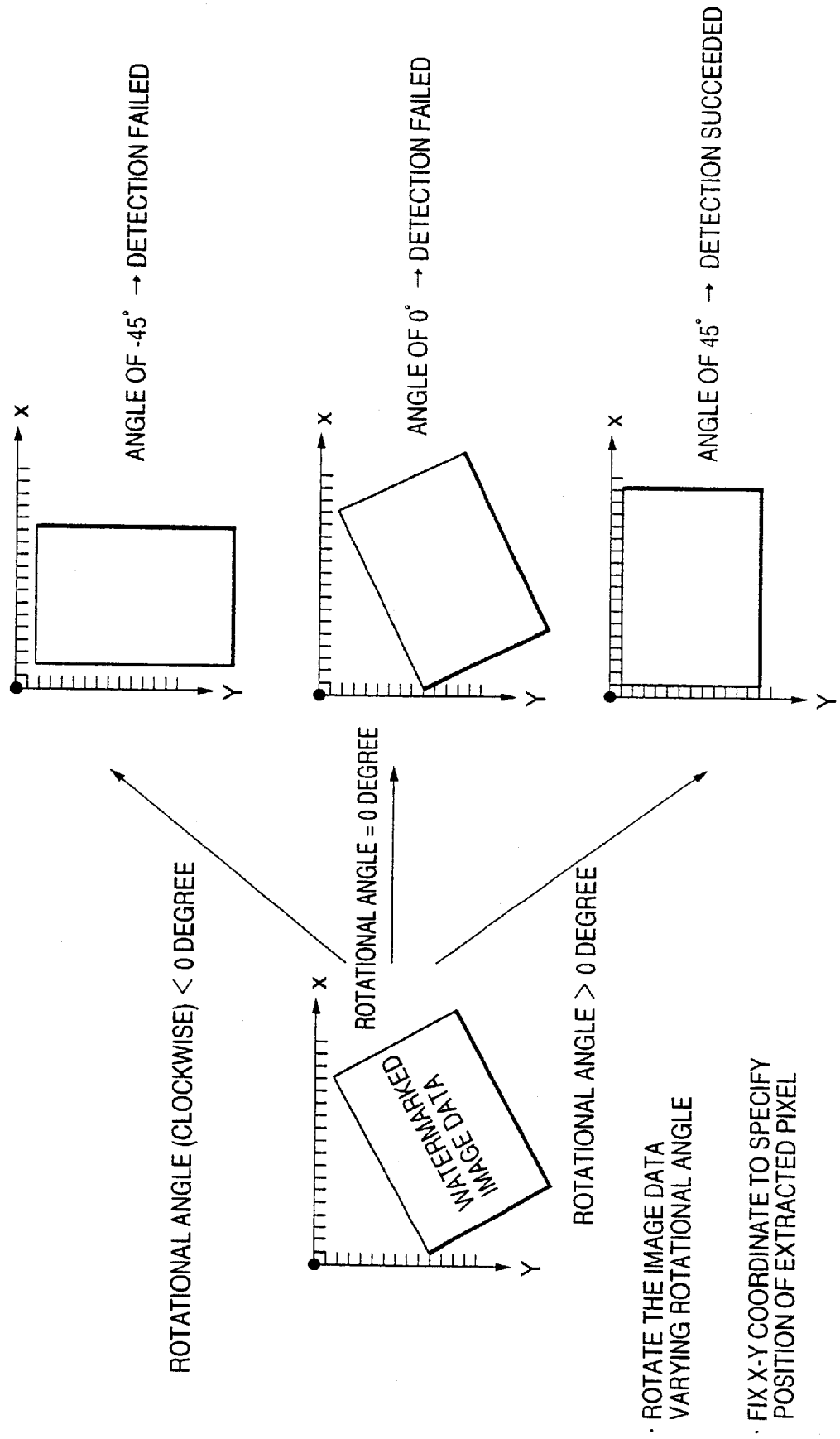
FIG. 2 is a diagram showing the principle of the extraction processing of extracting the digital watermark information from the image data according to the first embodiment of the present invention.

FIGS. 1 and 2 are diagrams showing the principle of the processing of extracting the digital watermark information from the image data according to the first embodiment of the present invention.

Figure 18:
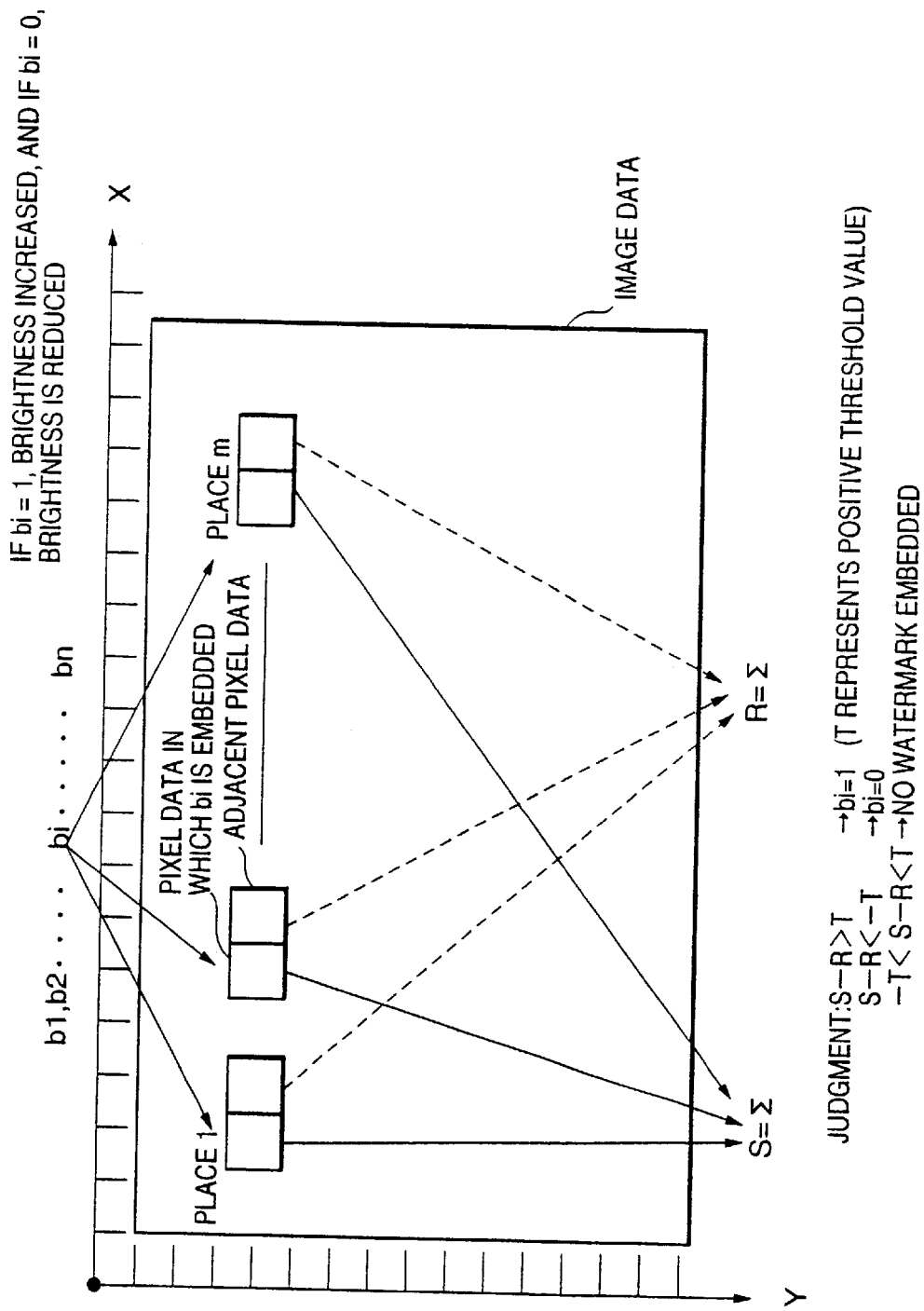
FIG. 18 is a diagram showing the principle of information embedding/extraction processing into/from image data based on a conventional digital watermark technique.
Figure 19:
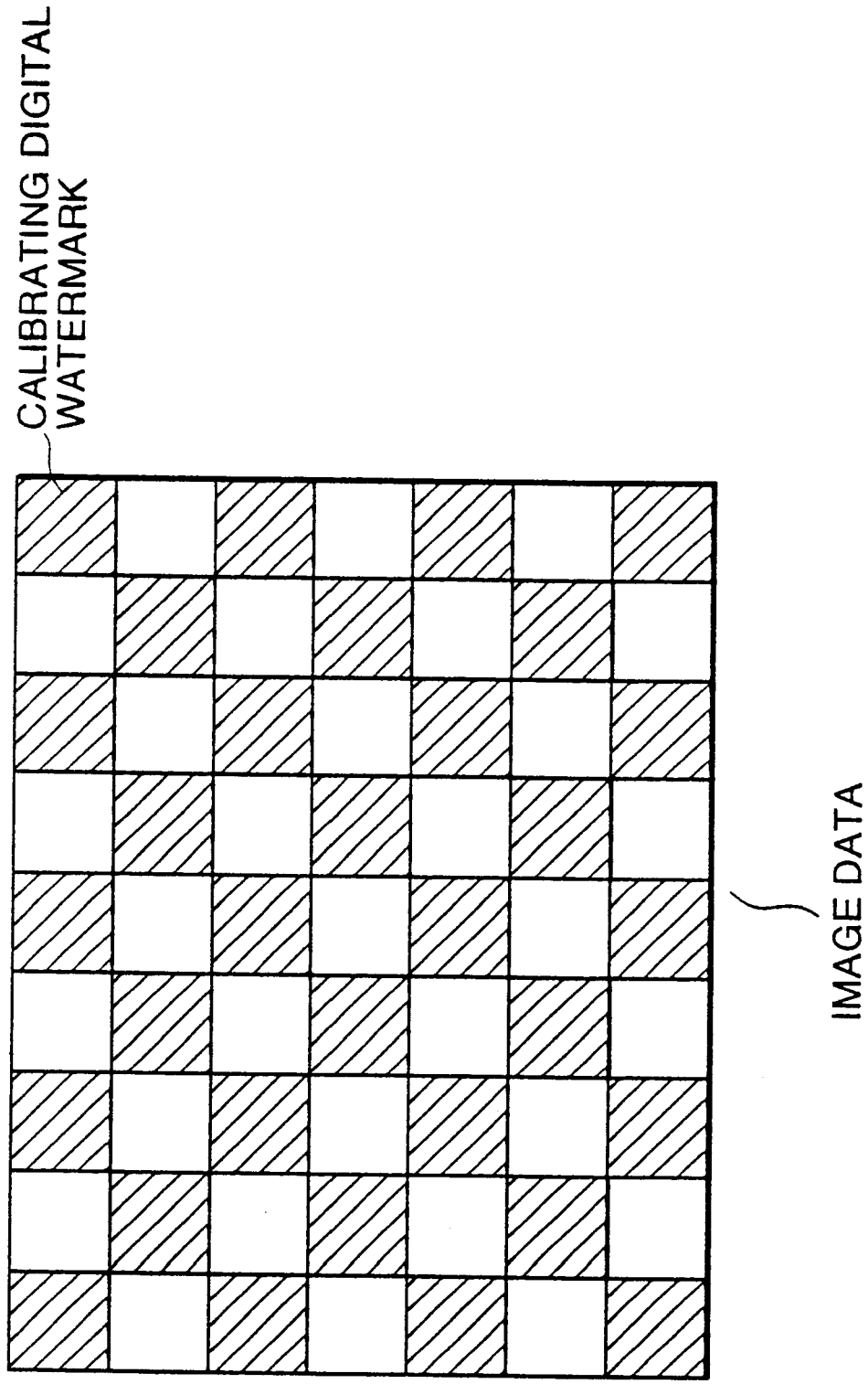
FIG. 19 is a diagram showing a technique of specifying a geometrical deformation applied to image data by using a conventional calibrating digital watermark.

As shown in FIG. 18, it is assumed that each of bits $b_1$ to $b_n$ constituting the digital watermark information is embedded in the image data so that the brightness of pixel data located at each of predetermined positions 1 to m on a specific X-Y coordinate is increased by U if the corresponding bit is equal to 1 or reduced by U if the corresponding bit is equal to zero, and then the image data having the digital watermark information embedded therein are scaled up/scaled down by a predetermined magnification. In this case, in the image data thus scaled up/down, the positional correspondence between each predetermined position (1 to m) on the specific X-Y coordinate of each of the bits $b_1$ to $b_n$ and the position of each pixel data at which each of the bits $b_1$ to $b_n$ is actually embedded is displaced, so that it cannot be extracted.

Therefore, as shown in FIG. 1, the size of the image data is scaled down to a predetermined size (for example, 0.5 times), pixel data located at predetermined positions 1 to m on the specific X-Y coordinate are extracted for each of bits of any number (for example, bits of 20<n) of the bits $b_1$ to $b_n$ constituting the digital watermark information, the differential value (S-R) between the sum S of the brightness values thereof and the sum R of the brightness values of the pixel data adjacent to the pixel data thus extracted is calculated, and then the differential value (S-R) is compared with a predetermined threshold value T to judge whether bit data are embedded in the pixel data thus extracted. If it is judged that no bit data are embedded in the pixel data extracted, the same processing is carried out while the scaled-down image data is enlarged every predetermined magnification rate (for example, every 1%). This processing is repeated until it is confirmed that the bit data are embedded.

The magnification rate is determined, in some cases, according to the positions of the pixel data where the watermark is embedded or the pattern of the watermark. For example, when the deformation rate applied to the image data is different a little from the detecting deformation rate applied to the image data or the coordinate for detecting the embedded information, if the embedded information can be detected from the image data, the magnification rate may be increased, still ensuring the detection of the watermark information.

If it is confirmed that the bit data are embedded (specifically, when image data having a size at which the absolute value of the differential value S-R is larger than the threshold value T and maximum are detected), for each of the bits $b_1$ to $b_n$ constituting the digital watermark information, the pixel data located at the predetermined positions 1 to m on the specific X-Y coordinate are extracted from the image having the size concerned, the differential value S-R between the sum S of the brightness values of the pixel data thus extracted and the sum R of the brightness values of pixel data adjacent to the respective pixel data thus extracted is calculated, and then the differential value S-R is compared with the threshold value T, thereby detecting the bit data embedded in the extracted pixel data. With this processing, the digital watermark information $b_1$ to $b_n$ embedded in the image data is detected.

For example, when the image data having the digital watermark information embedded therein is scaled down by 0.5 times, the digital watermark information can be detected by scaling up the image data concerned by two times as shown in FIG. 1.

Further, it is assumed that the image data having the bits $b_1$ to $b_n$ constituting the digital watermark information embedded therein as shown in FIG. 18 are subsequently rotated at a predetermined angle. In this case, in the image data thus rotated, each of the predetermined positions 1 to m on the specific X-Y coordinate for the respective bits $b_1$ to $b_n$ is displaced from the position of the pixel data in which each of the bits $b_1$ to $b_n$ is actually embedded (that is, the positional correspondence between each of the predetermined positions (1 to m) of the its $b_1$ to $b_n$ and the position of the pixel data in which the corresponding bit is actually embedded is broken), so that the digital watermark information cannot be detected.

Therefore, as shown in FIG. 2, the image data are rotated at a predetermined angle (for example, by −90 degrees in a clockwise direction). Thereafter, for each of any number of bits (for example, bits of 20<n) of the bits $b_1$ to $b_n$ constituting the digital watermark information, the pixel data located at the predetermined positions 1 to m on the specific X-Y coordinate are extracted, the differential value S-R between the sum S of the brightness values of the pixel data thus extracted and the sum R of the brightness values of the pixel data adjacent to the respective extracted pixel data is calculated, and the differential value thus calculated is compared with the threshold value T, thereby judging whether any bit data are embedded in the pixel data thus extracted. If it is judged that no bit data are embedded, the same processing is carried out while the image data thus rotated is further rotated by every predetermined angle (for example, every one degree in the clockwise direction). This processing is repeated until it is confirmed that the bit data are embedded.

The angle of rotation is determined, in some cases, according to the positions of the pixel data where the watermark is embedded or the pattern of the watermark. For example, when the angle of rotation applied to the image data is different a little from the detecting angle of rotation applied to the image data or the coordinate for detecting the embedded information, if the embedded information can be detected from the image data, the angle of rotation may be enlarged, still ensuring the detection of the watermark information.

If it is confirmed that the bit data are embedded in the pixel data, for each of the bits $b_1$ to $b_n$ constituting the digital watermark information, the pixel data located at the predetermined positions 1 to m on the specific X-Y coordinate are extracted from the image data at the rotational angle which is set at that time, the differential value S–R between the sum S of the brightness values of the pixel data thus extracted and the sum R of the brightness values of pixel data adjacent to the respective extracted pixel data is calculated, and then the differential value S–R is compared with the threshold value T, thereby detecting the bit data embedded in the pixel data thus extracted, whereby the digital watermark information $b_1$ to $b_n$ embedded in the image data is detected.

For example, when the image data having the digital watermark information embedded therein are rotated at −45 degrees in the clockwise direction, the digital watermark information can be detected by further rotating the rotated image data at 45 degrees in the clockwise direction as shown in FIG. 2.

In this embodiment, by executing both the processing shown in FIGS. 1 and 2 in combination, the position of digital watermark information embedded in image data is enabled to be specified, even when the scale-up/scale-down or rotation processing is conducted on the image data having the digital watermark information embedded therein.

Next, a digital watermark information extracting device for performing the above digital watermark information extraction processing will be described.

Figure 3:
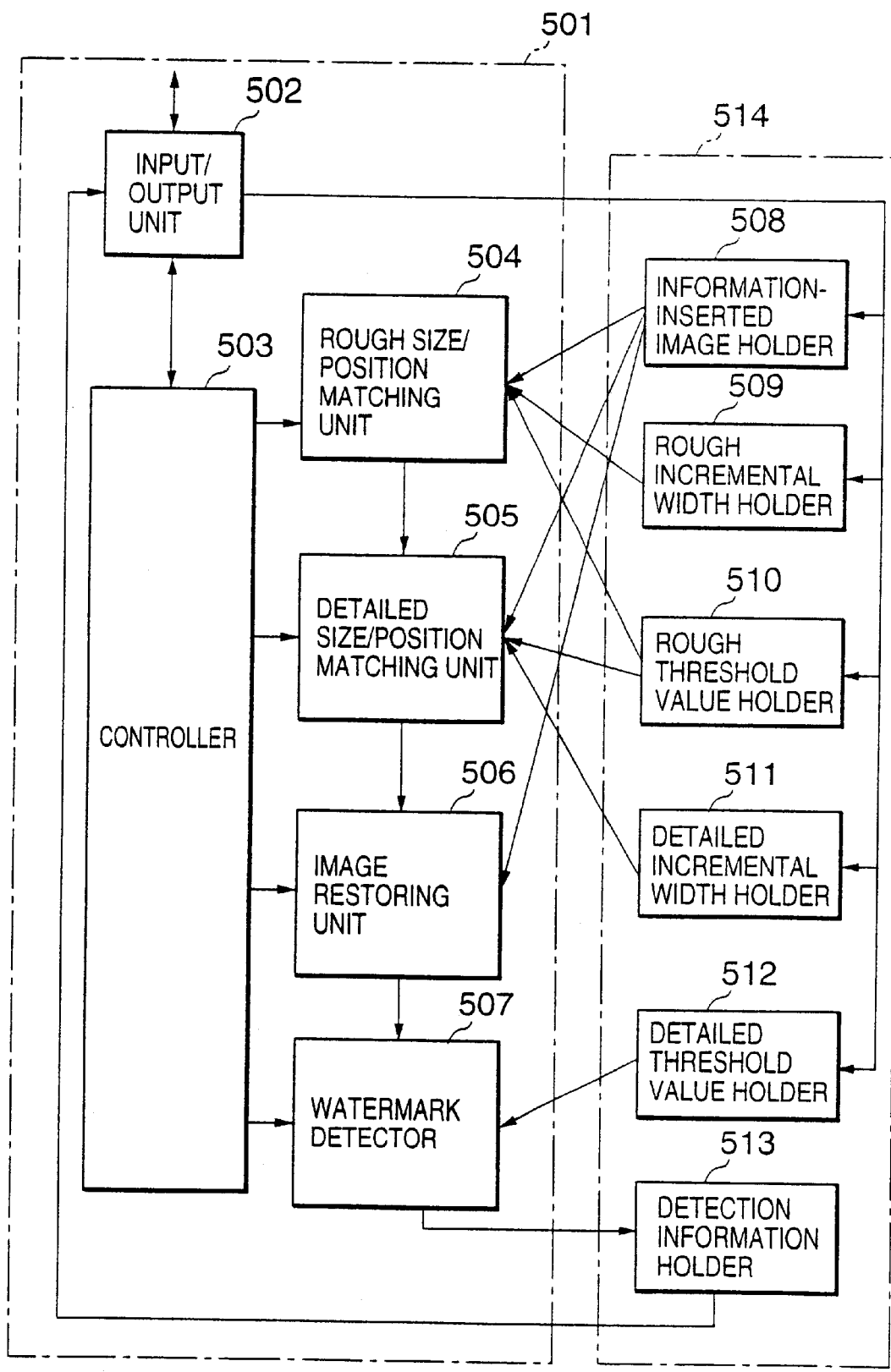
FIG. 3 is a functional diagram showing a digital watermark information extraction device to which the first embodiment of the present invention is applied.

FIG. 3 is a functional diagram showing the digital watermark information extraction device to which the first embodiment of the present invention is applied.

As shown in FIG. 3, the digital watermark information extraction device of this embodiment comprises a processor 501 and a storage unit 514.

The processor 501 comprises an input/output unit 502 serving to input/output image data having digital watermark information embedded therein and the digital watermark information extracted from the image data concerned, a controller 503 for collectively controlling each part of the digital watermark information extraction device, a rough size/position matching unit 504, a detailed size/position matching unit 505, an image restoring unit 506, and a watermark detector 507.

The storage unit 514 comprises an information-inserted inserted image holder 508 for holding image data, in which its $b_1$ to $b_n$ constituting the digital watermark information are embedded, input through the input/output unit 502, a roughly incremental width holder 509, a rough threshold value holder 510, a detailed incremental width holder 511, a detailed threshold value holder 512 and a detection information holder 513.

The rough size/position matching unit 504 determines rough size and rotational angle of the image data which are requested to detect digital watermark information embedded in the image data held in the information-inserted image holder 508.

Specifically, first, the image data held in the information-inserted image holder 508 are scaled down by a predetermined magnification (for example, 0.5 times). For each of any number of bits (for example, bits of 20<n) of the bits $b_1$ to $b_n$ constituting the digital watermark information, pixel data located at predetermined positions 1 to m (it is assumed that these predetermined positions are beforehand notified by a person who embeds digital watermark information) on a specific X-Y coordinate (which is an X-Y coordinate used when the digital watermark information is embedded and known) are extracted, the differential value S–R between the sum S of the brightness values of the pixel data thus extracted and the sum R of the brightness values of pixel data adjacent to the respective extracted pixel data is calculated, and then the differential value S–R thus calculated is compared with a first threshold value $T_1$ held in the rough threshold value holder 510 to judge whether bit data are embedded in the extracted pixel data concerned. A series of the above processing is carried out while rotating the image data by every first rotational angle (for example, every 3 degrees in the clockwise direction) held in the roughly incremental width holder 509 within a predetermined range (for example, in the range from 0 degree to 360 degrees). If it is judged that no bit data are embedded, the same processing is carried out while the image data are scaled up by every first magnification (for example, 3%) held in the rough incremental width holder 509. This processing is repetitively carried out until it is confirmed that the bit data are embedded (specifically, until the image data which is scaled up to a specific size and rotated by a specific rotational angle so that the absolute value of the differential value S–R is larger than the threshold value $T_1$ and maximum is detected).

The magnification and the angular increment held in the rough incremental width holder 509 are determined, in some cases, by the positions of the pixel data where the watermark is embedded as mentioned above. More particularly, even if the deformation/rotation applied to the pixel data is different from the detecting deformation/rotation applied to the image data or coordinate for detection of the embedded information, the magnification and the angular increment can be enlarged within a range the embedded information can be detected from the image data.

The detailed size/position matching unit 505 determines detailed size and rotational angle of the image data which are requested to detect the digital watermark information embedded in the image data held in the information-inserted image holder 508.

Specifically, the image data held in the information-inserted image holder 508 are scaled down by a magnification which is lower by a predetermined magnification (for example, α) than the magnification A of the image data when it is confirmed that the bit data are embedded by the rough size/position matching unit 505. For each of any number of bits (for example, bits of 20<n) of the bits $b_1$ to $b_n$ constituting the digital watermark information, the pixel data located at the predetermined positions 1 to m on the specific X-Y coordinate are extracted, the differential value S–R between the sum S of the brightness values of the pixel data and the sum R of the brightness values of the pixel data adjacent to the respective extracted pixel data is calculated, and then the differential value S–R is compared with the first threshold value $T_1$ to judge whether the bit data are embedded in the extracted pixel data. A series of the above processing is carried out while the image data are rotated by every second rotational angle (for example, one degree by one degree in the clockwise direction) smaller than the first rotational angle (the second rotational angle is held in the detailed incremental width holder 511) within a predetermined range (for example, in the range from B−β degree to B+β degree in the clockwise direction) containing the rotational angle B of the image data at the time when it is confirmed that the bit data are embedded in the pixel data by the rough size/position matching unit 505. If it is judged that no bit data are embedded, the same processing is executed while the image data are scaled up by every second magnification (for example, 1%) smaller than the first magnification, the second magnification being held in the detailed incremental width holder 511. This processing is repetitively carried out until it is confirmed that the bit data are embedded.

The first rotational angle and magnification held in the rough incremental width holder 509, the second rotational angle and magnification held in the detailed incremental width holder 511 and the first threshold value $T_1$ held in the rough threshold value holder 510 may be set through the input/output unit 502 by an operator.

The magnification or rotation of rough increment is determined, in some cases, by the positions of the pixel data where the watermark is embedded or the pattern of the watermark as stated above. More particularly, even when the deformation/rotation applied to the pixel data is different from the detecting deformation/rotation applied to the image data or coordinate for detection of the embedded information, the magnification and the rotational angle can be enlarged within a range the embedded information can be detected from the image data. Or, it is also possible to enlarge the first magnification/rotational angle for the rough increment while reducing the second magnification/rotational angle.

The image restoring unit 506 deforms the image data held in the information-inserted image holder 508 by the magnification and the rotational angle at the time when it is confirmed that the bit data are embedded by the detailed size/position matching unit 505, thereby restoring the original image data before the scale-up/scale-down or rotation is applied to the image data.

For each of the bits $b_1$ to $b_n$ constituting the digital watermark information, the detector 507 extracts the pixel data located at the predetermined positions 1 to m on the specific X-Y coordinate from the image data restored in the image restoring unit 506, calculates the differential value S-R between the sum S of the brightness values of the extracted pixel data and the sum R of the brightness values of the pixel data adjacent to the extracted pixel data, and compares the differential value S-R with a second threshold value $T_2$ whose absolute value is larger than the first threshold value $T_1$, the second threshold value $T_2$ being held in the detailed threshold value holder 512, thereby judging the bit value of the bit data. More specifically, if $S-R \geq T_2$, the bit concerned is judged as "1". If $S-R \leq -T_2$, the bit concerned is judged as "0". If $-T_2 < S-R < T_2$, it is judged that no bit is embedded in the extracted pixel data.

Further, the watermark detector 507 holds the extracted digital watermark information in the detection information holder 513. This information is output through the input/output unit 502, and submitted to the operator.

Here, the relationship between the first threshold value $T_1$ held in the rough threshold value holder 510 and the second threshold value $T_2$ held in the detailed threshold value holder 512 will be described.

An error rate when all of digital watermark information $b_1$ to $b_{50}$ of 50 bits embedded in image data are detected from the image data is represented by A, and an error rate when each bit constituting the digital watermark information $b_1$ to $b_{50}$ are detected from the image data is represented by P. In this case, the following relational expression is established between A and P:

$$A = \sum_{i=1}^{50} {}_{50}C_i \times P^i \times (1-P)^{50-i}$$

Assuming that the error rate A requested when all the digital watermark information $b_1$ to $b_{50}$ of 50 bits are detected from in the image data are equal to $10^{-6}$, the error rate P of each bit must be set to be smaller than $10^{-8}$.

Accordingly, in order to detect all the digital watermark information $b_1$ to $b_{50}$ of 50 bits embedded in the image data at the error rate of $10^{-6}$, it is necessary to detect each of the bits $b_1$ to $b_{50}$ at an error rate smaller than $10^{-8}$. However, if in the rough size/position matching unit 504 and the detailed size/position matching unit 505, the first threshold value $T_1$ is set so that the detection can be performed at an error rate of $10^{-8}$ and it is judged whether bit data are embedded or not while varying the size and rotational angle of the image data, this needs much processing time.

Therefore, according to this embodiment, in the rough size/position matching unit 504 and the detailed size/position matching unit 505, whether bit data are embedded or not is judged by using the first threshold value $T_1$ which is set so that bit data can be detected at an error rate (for example, about $10^{-2}$) larger than the error rate of each bit which is originally requested when the size and rotational angle of the image data requested to detect the digital watermark information embedded in the image data is determined. After the size and rotational angle of the image data are determined, the bit value of each of the bits $b_1$ to $b_{50}$ constituting the digital watermark information embedded in the image data is judged in the watermark detector 507 by using the second threshold value $T_2$ (whose absolute value is larger than the first threshold value $T_1$) which is set so that bit data can be detected at an originally requested error rate $10^{-8}$ of each bit.

Assuming that the embedding position of the bit data could be confirmed if all of 20 bits out of the bits $b_1$ to $b_{50}$ constituting the digital watermark information can be detected at an error rate of about $10^{-2}$, the probability that an error occurs in the above judgment is equal to $10^{-27}$, and this means that there is no problem in practice.

Figure 4:
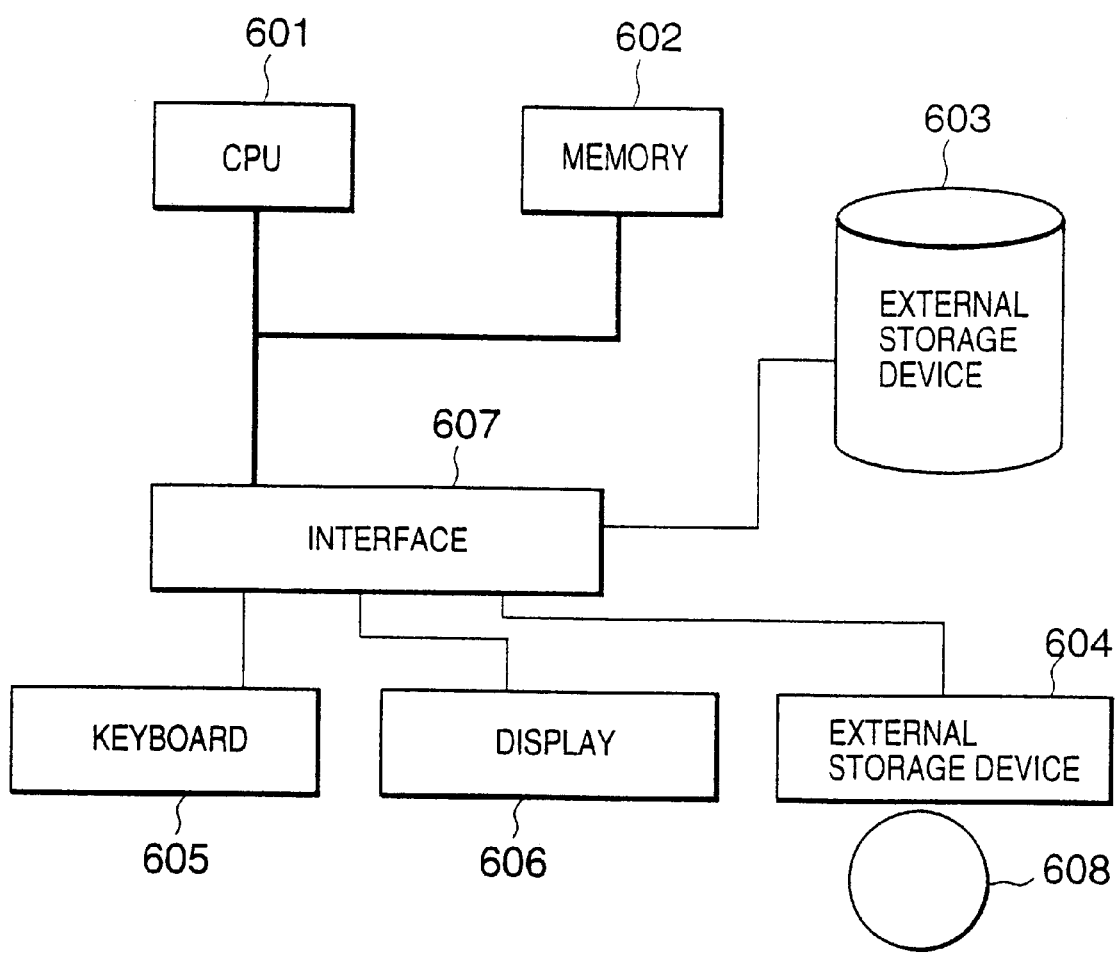
FIG. 4 is a diagram showing a hardware configuration of the digital watermark information extraction device shown in FIG. 3.

Next, the hardware construction of the digital watermark information extraction device to which this embodiment is applied will be described. FIG. 4 is a diagram showing a hardware construction of the digital watermark information extraction device shown in FIG. 3.

As shown in FIG. 4, the digital watermark information extraction device of this embodiment can be built up on an information processing device having a general construction which includes a CPU 601, a memory 602, an external storage device 603 such as a hard disc device and another external storage device 604, an input device 605 such as a keyboard, an output device 606 such as a display or the like, and an interface 607 for the external storage devices and the input/output device. Here, each part of the processor 501 shown in FIG. 3 is implemented as a process embodied on the information processing device by executing a program loaded onto the memory 602 by the CPU 601. In this case, the memory 602 and the external storage devices 603, 604 are used as the storage unit 514 shown in FIG. 2.

The program which is executed by the CPU 601 to embody the digital watermark information extraction device of this embodiment is beforehand stored in the external storage device 603, and it is loaded onto the memory 602 and executed by the CPU 601 as occasion demands. Or, it is loaded through the external storage device 604 handling a portable storage medium 608, for example, CD-ROM, if necessary, from the portable storage medium 608 onto the memory 602 and then executed by the CPU 601. Alternatively, it is temporarily installed from the portable storage medium 608 through the external storage device 604 into the external storage device 603, and then it is loaded from the external storage device 603 onto the memory 602 and executed by the CPU 601. Or, it is loaded from a network to the external storage device 603 through a network connection device (not shown), then loaded onto the memory 602 or directly loaded from the network onto the memory 602 and then executed by the CPU 601.

Next, the operation of the digital watermark information extraction device to which this embodiment is applied will be described.

First, the operation of the rough size/position matching unit 504 will be described.

Figure 5:
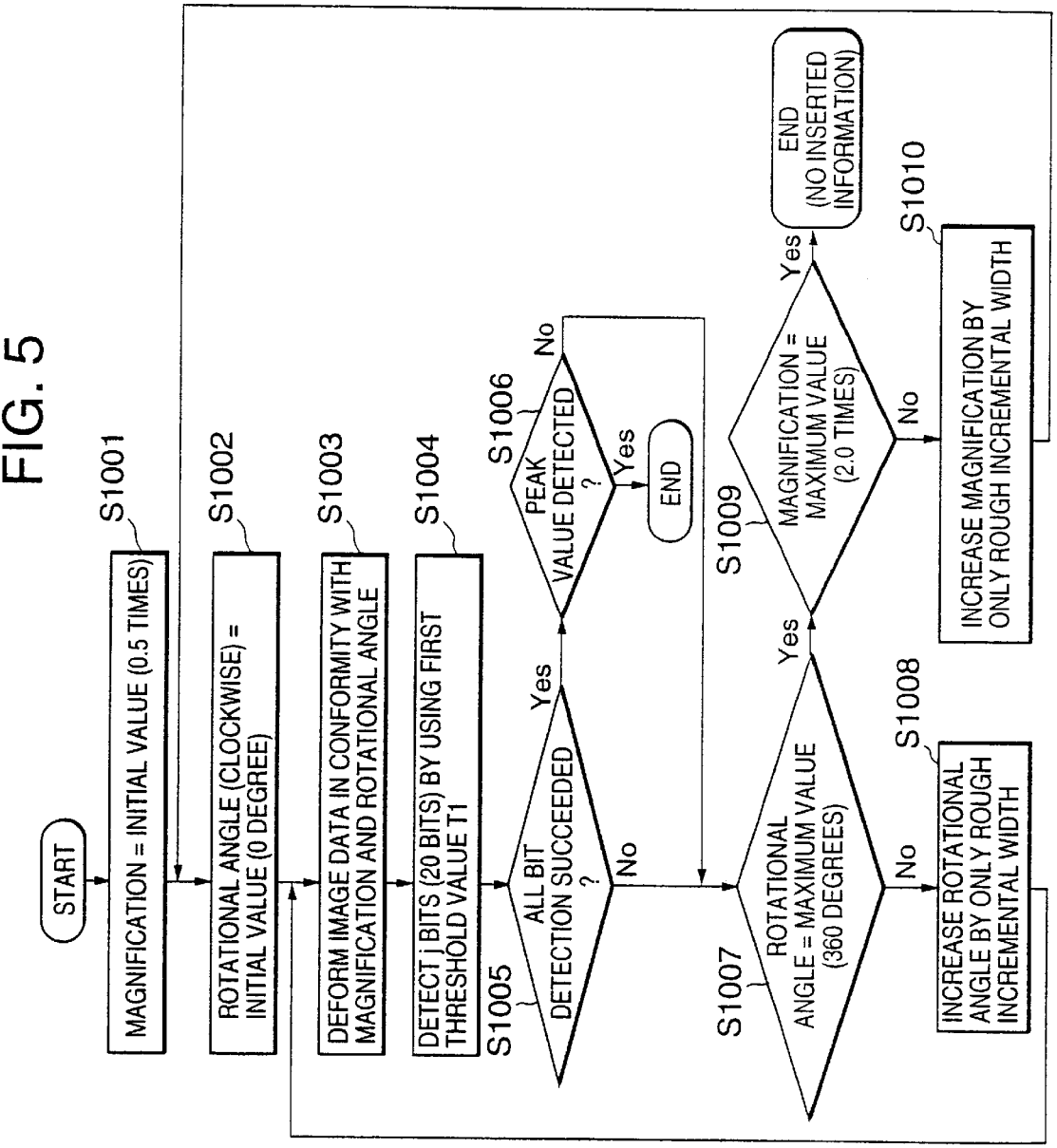
FIG. 5 is a flowchart showing the operation of a rough size/position matching unit 504 according to the first embodiment of the present invention.

FIG. 5 is a flow chart showing the operation of the rough size/position matching unit 504 of this embodiment. In cooperation with the input/output unit 502, when the controller 503 controls the image data having the information of the bits $b_1$ to $b_n$ constituting the digital watermark information to be held in the information-inserted image holder 508, this flow is started.

First, the rough size/position matching unit 504 sets the magnification to an initial value (for example, 0.5 times) (step S1001), and then sets the rotational angle to an initial value (for example, 0 degree) (step S1002). Subsequently, the rough size/position matching unit 504 deforms the image data held in the information-inserted image holder 508 according to the magnification and the rotational angle thus set (step S1003).

Subsequently, the rough size/position matching unit 504 extracts, for each of j bits (j<n) (for example, 20 bits of $b_1$ to $b_{20}$) of the bits $b_1$ to $b_n$ constituting the digital watermark information, pixel data located at predetermined positions 1 to m (it is assumed that these positions are beforehand notified by a person who embeds digital watermark information, for example) on a specific X-Y coordinate (which is an X-Y coordinate used when the digital watermark information is embedded and known), calculates the differential value S–R between the sum S of the brightness values of the extracted pixel data and the sum R of the brightness values of pixel data adjacent to the respective extracted pixel data and then comparing the differential value S–R with the first threshold value $T_1$ held in the rough threshold value holder 510 to judge whether bit data are embedded in the extracted pixel data (step S1004). More specifically, whether the bit data are embedded in the extracted pixel data concerned is judged by judging whether the absolute value of the differential value S–R is larger than the absolute value of the first threshold value $T_1$. When it is confirmed for all the bits of j that the bit data concerned are embedded in the extracted pixel data (step S1005), it is judged whether the peak value of the sum of the absolute values of the differential values S–R calculated for the respective j bits is detected(step S1006). Here, the detection of the peak value is performed because it is considered that as each of the predetermined positions 1 to m on the specific X-Y coordinate for the bits $b_1$ to $b_n$ approaches to the position of the pixel data at which each of the bits $b_1$ to $b_n$ is actually embedded, the sum of the absolute values of the differential values S–R is increased.

When the peak value is detected in step S1006, the magnification and the rotational angle set at the time when the peak value is detected. are settled as the magnification and the rotational angle for specifying the rough size and rotational angle of the image data, and the processing is finished.

If it is not confirmed for all the j bits in step S1005 that the bit data concerned are embedded and if it is judged in step S1006 that any peak value has not yet been detected, the processing goes to step S1007. In step S1007, the rough size/position matching unit 504 judges whether the set rotational angle reaches the maximum value (for example, 360 degrees). If it does not reach the maximum value, the set rotational angle is incremented by only an incremental width (for example, 3 degrees) held in the rough incremental width holder 509 (step S1008), and the processing returns to step S1003. On the other hand, if it reaches the maximum value, it is judged whether the set magnification reaches the maximum value (for example, two times) (step S1009). If it does not reach the maximum value, the set magnification is incremented by only an incremental width (for example, 3%) held in the rough incremental width holder 509 (step S1010), and the processing returns to step S1002.

On the other hand, if the set magnification reaches the maximum value, it is confirmed that no digital watermark information is embedded in the image data, and the processing is finished.

Next, the operation of the detailed size/position matching unit 505 will be described.

Figure 6:
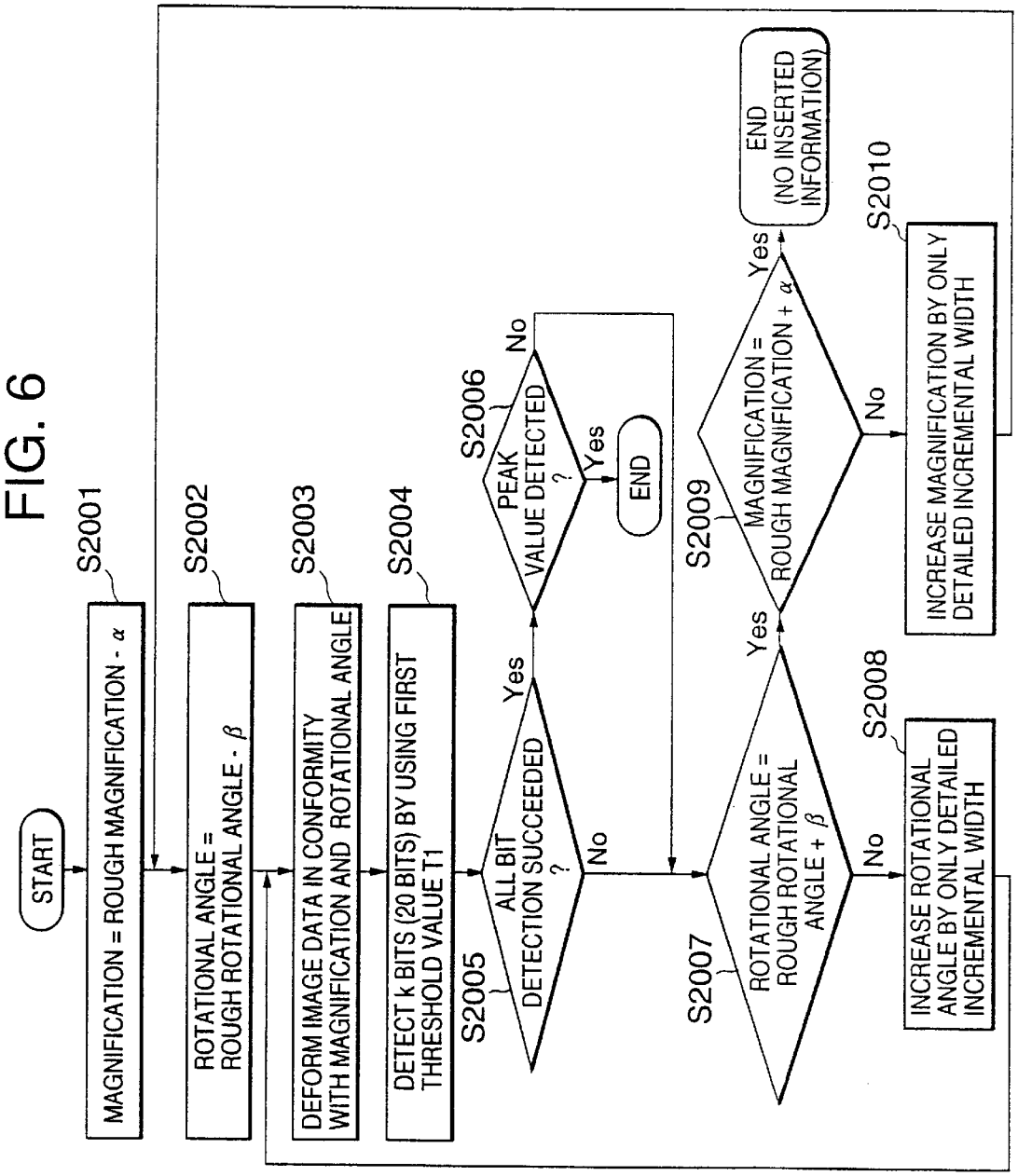
FIG. 6 is a flowchart showing the operation of a detailed size/position matching unit 505 according to the first embodiment of the present invention.

FIG. 6 is a flowchart showing the operation of the detailed size/position matching unit 505 according to this embodiment. This processing is started at the time when the rough size/position matching unit 504 determines the magnification and the rotational angle to specify the rough size and rotational angle of the image data through the processing flow of FIG. 5.

First, the detailed size/position matching unit 505 sets the magnification to the rough magnification determined in the rough size/position matching unit 504−α(α is set to the same magnification as the incremental magnification held in the rough incremental width holder 509, for example) (step S2001), and then sets the rotational angle to the rough rotational angle determined in the rough size/position matching unit 504−β (β is set to the same rotational angle as the incremental rotational angle held in the rough incremental holder 509, for example) (step S2002). Next, the detailed size/position matching unit 505 deforms the image data held in the information-inserted image holder 508 according to the magnification and the rotational angle thus set (step S2003).

Subsequently, the detailed size/position matching unit 505 extracts, for each of bits of k (<n) (for example 20 bits of $b_{21}$ to $b_{40}$) out of the bits $b_1$ to $b_n$ constituting the digital watermark information, the pixel data located at the predetermined positions 1 to m on the X-Y coordinate used when the digital watermark information is embedded, calculates the differential value between the sum S of the brightness values of the pixel data and the sum R of the brightness values of pixel data adjacent to the extracted pixel data and then comparing the differential value S–R thus calculated with the first threshold value $T_1$ held in the rough threshold value holder 510, thereby judging whether bit data are embedded in the extracted pixel data (step S2004). If it is confirmed for all the bits of k that the bit data concerned are embedded in the extracted pixel data (step S2005), it is judged that the peak value of the sum of the absolute values of the differential values S–R calculated for the respective bits of k is detected (step S2006). If the peak value is detected, the magnification and the rotational angle set at the time when the peak value is detected are determined as the magnification and the rotational angle to specify the detailed size and rotational angle, and then the processing is finished.

If, in step S2005, it is not confirmed for all the bits of k that the bit data concerned are embedded in the extracted pixel data, and if it is judged in step S2006 that any peak value has not yet been detected, the processing goes to step S2007. Therefore, the detailed size/position matching unit 505 judges whether the set rotational angle reaches the rough rotational angle determined in the rough size/position matching unit 504+β.

If it does not reach the rough rotational angle+β, the set rotational angle is incremented by only an incremental width (for example, 1 degree) which is held in the detailed incremental width holder 511 and is smaller than the incremental width held in the rough incremental width holder 509 (step S2008), and then the processing returns to step S2003.

On the other hand, if it reaches the rough rotational angle +β, it is judged whether the set magnification reaches the rough magnification determined in the rough size/position matching unit 504+α (step S2009). If it does not reach the rough magnification+α, the set magnification is incremented by only an incremental width (for example, 1%) which is held in the detailed rough incremental width holder 511 and is smaller than the incremental width held in the rough incremental width holder 509 (step S2010), and then the processing returns to step S2002.

On the other hand, if the set magnification reaches to the rough magnification+α, it is confirmed that no digital watermark information is embedded in the pixel data, and the processing is finished.

If the magnification and rotational angle to specify the detailed size and rotational angle of the image data are determined through the processing flow of FIG. 6 in the detailed size/position matching unit 505, the image restoring unit 506 deforms the image data held in the information-inserted image holder 508 on the basis of the magnification and the rotational angle thus determined to restore the image data before the geometrical deformation is applied thereto.

The watermark detector 507 is supplied with the image data thus restored, and, for each of the bits $b_1$ to $b_n$ constituting the digital watermark information, extracts the pixel data located at the predetermined positions 1 to m on the X-Y coordinate used in the embedding process of the digital watermark information, from the image data thus restored, calculating the differential value S−R between the sum S of the brightness values thereof and the sum R of the brightness values of pixel data adjacent to the extracted pixel data and then comparing the differential value S−R thus calculated with the second threshold value $T_2$ which is held in the detailed threshold value holder 512 and whose absolute value is larger than the first threshold value $T_1$, thereby judging the bit value of the bit data. More specifically, if S−R≧$T_2$, the bit concerned is judged as "1", if S−R≦$T_2$, the bit concerned is judged as "0", and if −$T_2$<S−R≦$T_2$, it is judged that no bit is embedded in the extracted pixel data.

The watermark detector 507 holds the digital watermark information thus extracted into the detection information holder 513. This information is output through the input/output unit 502 and given to the operator.

According to the above-described first embodiment of the present invention, the embedding position of the digital watermark information can be specified from the geometrically-deformed image data without using any calibrating digital watermark. In the above first embodiment, the magnification and the rotational angle to specify the rough size and rotational angle of the image data which are requested to detect the digital watermark information embedded in the image data are determined in the rough size/position matching unit 504, and then the magnification and rotational angle to specify the detailed size and rotational angle of the image data which are requested to detect the digital watermark information are determined on the basis of the determined rough magnification and rotational angle in the detailed size/position matching unit 505. With the above operation, the check of the pixel data in which the digital watermark information is embedded can be more efficiently performed.

Further, according to the first embodiment, in the rough size/position matching unit 504 and the detailed size/position matching unit 505, the absolute value of the first threshold value $T_1$ used to judge whether bit data are embedded in extracted pixel data is set to be smaller than that of the second threshold value $T_2$ used to judge the data value of the bit data embedded in the extracted pixel data in the watermark detector 507, thereby more moderating the precision at the size/position matching stage of the image data as compared with the precision at the judgment stage of the digital watermark information. Accordingly, the check of the pixel data having the digital watermark information embedded thereof can be more efficiently and quickly performed.

Next, a second embodiment of the present invention will be described.

Unlike the first embodiment, according to the second embodiment, the processing of extracting at least one pixel data located at the predetermined position on the specific coordinate X-Y coordinate from image data in which digital watermark information is embedded by altering at least one pixel data located at a predetermined position on a specific coordinate X-Y coordinate and to which any geometrical deformation is applied, and then comparing the data value of the pixel data thus extracted with a reference value to judge whether information is embedded in the pixel data concerned is executed with leaving the image data itself as it is while deforming the specific X-Y coordinate itself until it is confirmed that the information is embedded in the pixel data concerned.

First, prior to the detailed description of a digital watermark information extracting device to which the second embodiment is applied, the principle of the digital watermark extracting processing of this embodiment will be described.

Figure 7:
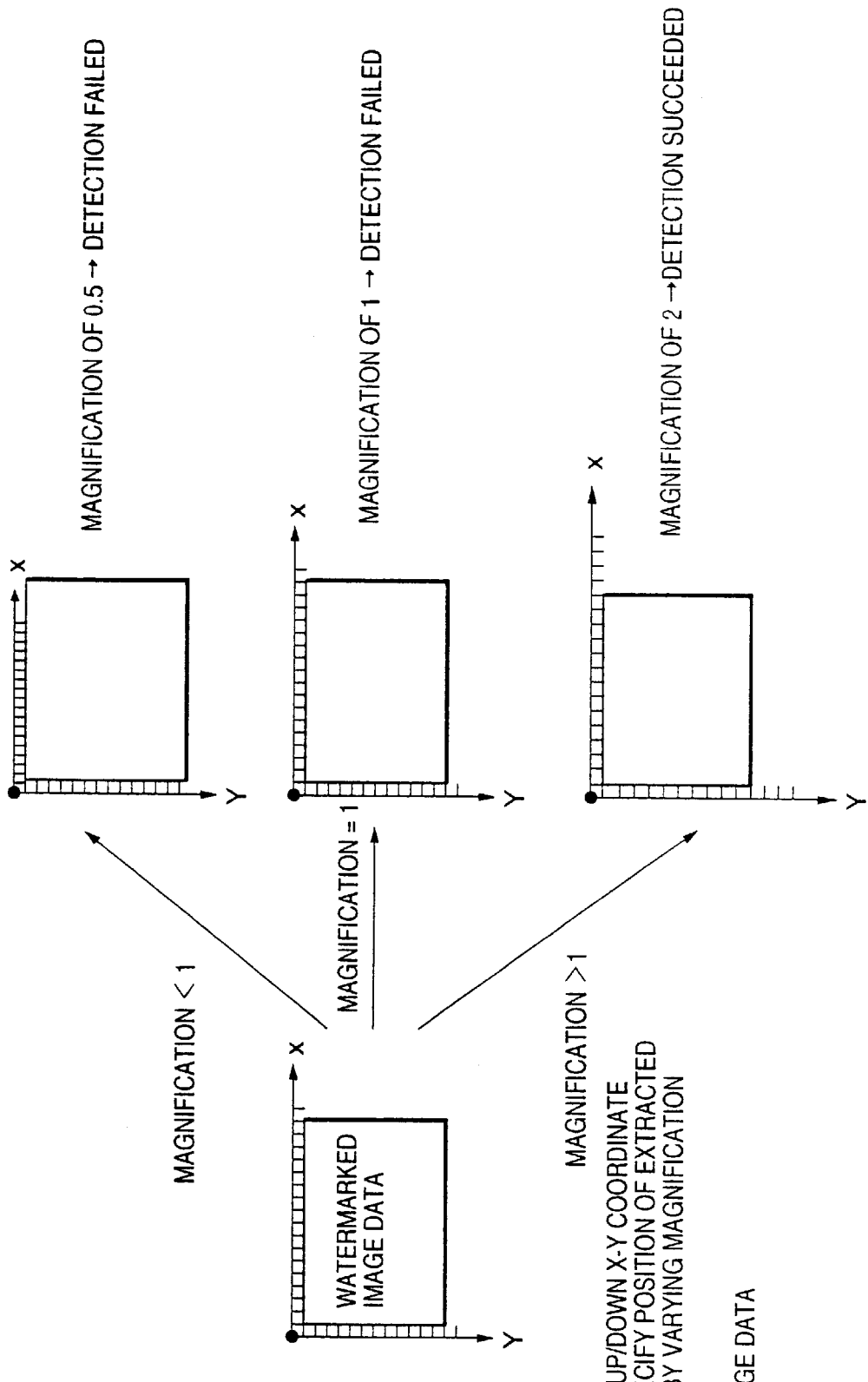
FIG. 7 is a diagram showing the principle of extraction processing of extracting digital watermark information from image data according to a second embodiment of the present invention.
Figure 8:
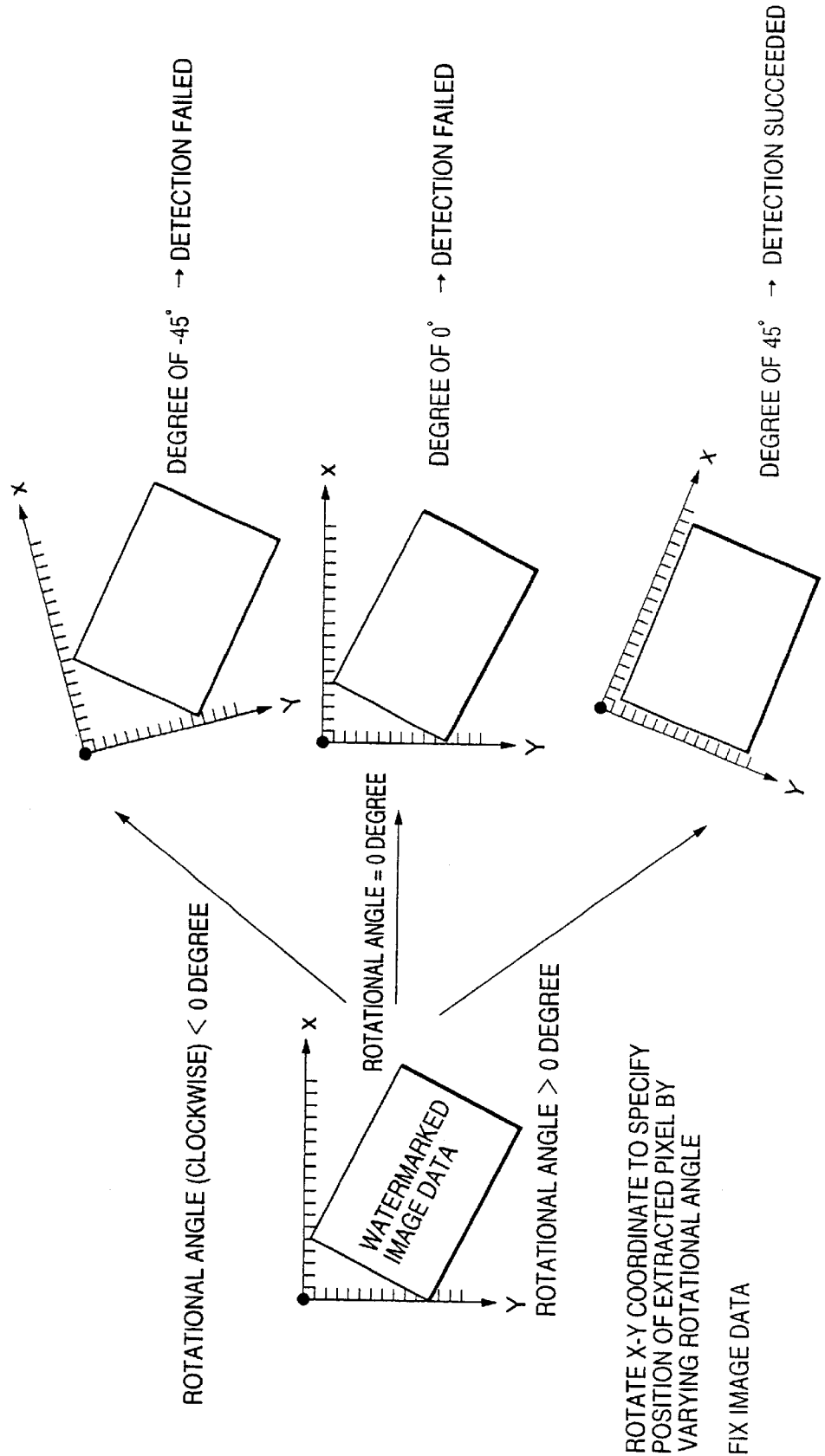
FIG. 8 is a diagram showing the principle of the extraction processing of extracting the digital watermark information from the image data according to the second embodiment of the present invention.

FIGS. 7 and 8 are diagrams showing the principle of the processing of extracting digital watermark information from image data according to the second embodiment of the present invention.

As shown in FIG. 18, it is assumed that each of the bits $b_1$ to $b_n$ constituting digital watermark information is embedded in image data so that the brightness of each of pixel data located at predetermined positions 1 to m on a specific X-Y coordinate is altered so as to be increased by U if the bit concerned is equal to 1, and so as to be reduced by U if the bit concerned is equal to zero. Further, it is also assumed that the image data having the digital watermark information embedded therein is subsequently scaled up/down by a predetermined magnification. In this case, in the scaled-up/down image data, the positional correspondence between the predetermined positions 1 to m on the specific coordinate for each of the bits $b_1$ to $b_n$ and the position of pixel data at which each of the bits $b_1$ to $b_n$ is actually embedded is broken (i.e., these positions are positionally displaced from each other), and thus the digital watermark information cannot be extracted.

Therefore, as shown in FIG. 7, the specific X-Y coordinate (the coordinate used when the digital watermark information is embedded in the image data) is scaled down to a predetermined size (for example, by 0.5 times). Thereafter, for each of any number of bits (for example, bits of 20 (<n)) of the bits $b_1$ to $b_n$ constituting the digital watermark information, the pixel data located at the predetermined positions on the scaled-down X-Y coordinate are extracted, the differential value S−R between the sum S of the brightness values of the pixel data thus extracted and the sum R of the brightness values of the pixel data adjacent to the extracted pixel data is calculated and then the differential value S–R is compared with a predetermined threshold value T, thereby judging whether the bit data are embedded in the extracted pixel data.

The magnification may, in some cases, be determined by the positions of the pixel data where the watermark is embedded or the pattern of the watermark as stated above. More particularly, even when the deformation rate applied to the pixel data is different from the detecting deformation rate applied for detection of the embedded information, the magnification can be enlarged within a range the embedded watermark information can be detected from the image data. If it is judged that no bit data are embedded, the same processing is carried out while the X-Y coordinate is scaled up by every predetermined magnification (for example, 1% by 1%). This processing is repetitively carried out until it is confirmed that the bit data are embedded. If it is confirmed that the bit data are embedded (specifically, the X-Y coordinate having the size which provide the absolute value of the differential value S–R which is larger than the threshold value T and maximum is detected), for each of the bits $b_1$ to $b_n$ constituting the digital watermark information, on the basis of the X-Y coordinate of the magnification at that time, pixel data located at the predetermined positions 1 to m are extracted, the sum S of the brightness values of the pixel data thus extracted and the sum R of the brightness values of the pixel data adjacent to the extracted pixel data is calculated, and then the differential value S–R is compared with a predetermined threshold value T to detect the bit data embedded in the pixel data thus extracted, whereby the digital watermark information $b_1$ to $b_n$ embedded in the image data is detected.

For example, when image data having digital watermark information embedded therein is scaled up by two times, the X-Y coordinate used when the digital watermark information is embedded in the image data is scaled up by two times, whereby the digital watermark information can be detected as shown in FIG. 7.

It is assumed that the image data having the bits $b_1$ to $b_n$ constituting the digital watermark information embedded therein as shown in FIG. 18 is subsequently rotated at a predetermined angle. In this case, in the image data thus rotated, each of the predetermined positions 1 to m on the specific X-Y coordinate for each of the bits $b_1$ to $b_n$ is displaced from the position of pixel data at which each of the bits $b_1$ to $b_n$ is actually embedded, so that the digital watermark information cannot be extracted.

Therefore, as shown in FIG. 8, the specific X-Y coordinate is rotated at a predetermined angle (for example, by −90 degrees in the clockwise direction). Thereafter, for each of any number of bits (for example, 20 bits (<n)) of the bits $b_1$ to $b_n$ constituting the digital watermark information, the pixel data located at the predetermined positions 1 to m on the X-Y coordinate thus rotated are extracted, the differential value S–R between the sum S of the brightness values of the extracted pixel data and the sum R of the brightness values of pixel data adjacent to the extracted pixel data is calculated, and then the differential value S–R thus calculated is compared with a predetermined threshold value T, thereby judging whether bit data are embedded in the extracted pixel data.

The rotational angle may, in some cases, be determined by the positions of the pixel data where the watermark is embedded or the pattern of the watermark as stated above. More particularly, even when the angle of rotation applied to the pixel data is different from the detecting angle of rotation applied for detection of the embedded information, the rotational angle can be enlarged within a range the embedded watermark information can be detected from the image data. If it is judged that no bit data are embedded, the same processing is carried out while the X-Y coordinate is further rotated by every predetermined angle (for example, by one degree in the clockwise direction). This processing is repetitively carried out until it is confirmed that the bit data are embedded in the pixel data. If it is confirmed that the bit data are embedded, for each of the bits $b_1$ to $b_n$ constituting the digital watermark information, on the basis of the X-Y coordinate having the rotational angle at that time, pixel data located at predetermined positions 1 to m are extracted, the differential value S–R between the sum S of the brightness values of the extracted pixel data and the sum R of the brightness values of the pixel data adjacent to the extracted pixel data is calculated, and then the differential value S–R is compared with a threshold value T to detect the bit data embedded in the extracted pixel data, whereby the digital watermark information $b_1$ to $b_n$ embedded in the image data is detected.

For example, when the image data having the digital watermark information embedded therein are rotated by 45 degrees in the clockwise direction, the X-Y coordinate used in the process of embedding the digital watermark information into the image data is rotated at 45 degrees in the clockwise direction as shown in FIG. 8, whereby the digital watermark information can be detected.

In this embodiment, by executing the processing shown in FIG. 7 and the processing shown in FIG. 8 in combination, the position of digital watermark information embedded in image data can be specified even when the image data having the digital watermark information embedded therein are subjected to the scale-up/scale-down or rotating processing.

Next, a digital watermark information extracting device for executing the above digital watermark information extracting processing will be described. The functional configuration of the digital watermark information extracting device to which this embodiment is applied is different from that of the first embodiment in the operations of the rough size/position matching unit 504 and the detailed size/position matching unit 505. The hardware configuration of the second embodiment is the same as shown in FIG. 4. Therefore, the description of the functional configuration and hardware configuration of the digital watermark information extracting device are omitted, and only the operation thereof will be described.

First, the operation of the rough size/position matching unit 504 of this embodiment will be described.

Figure 9:
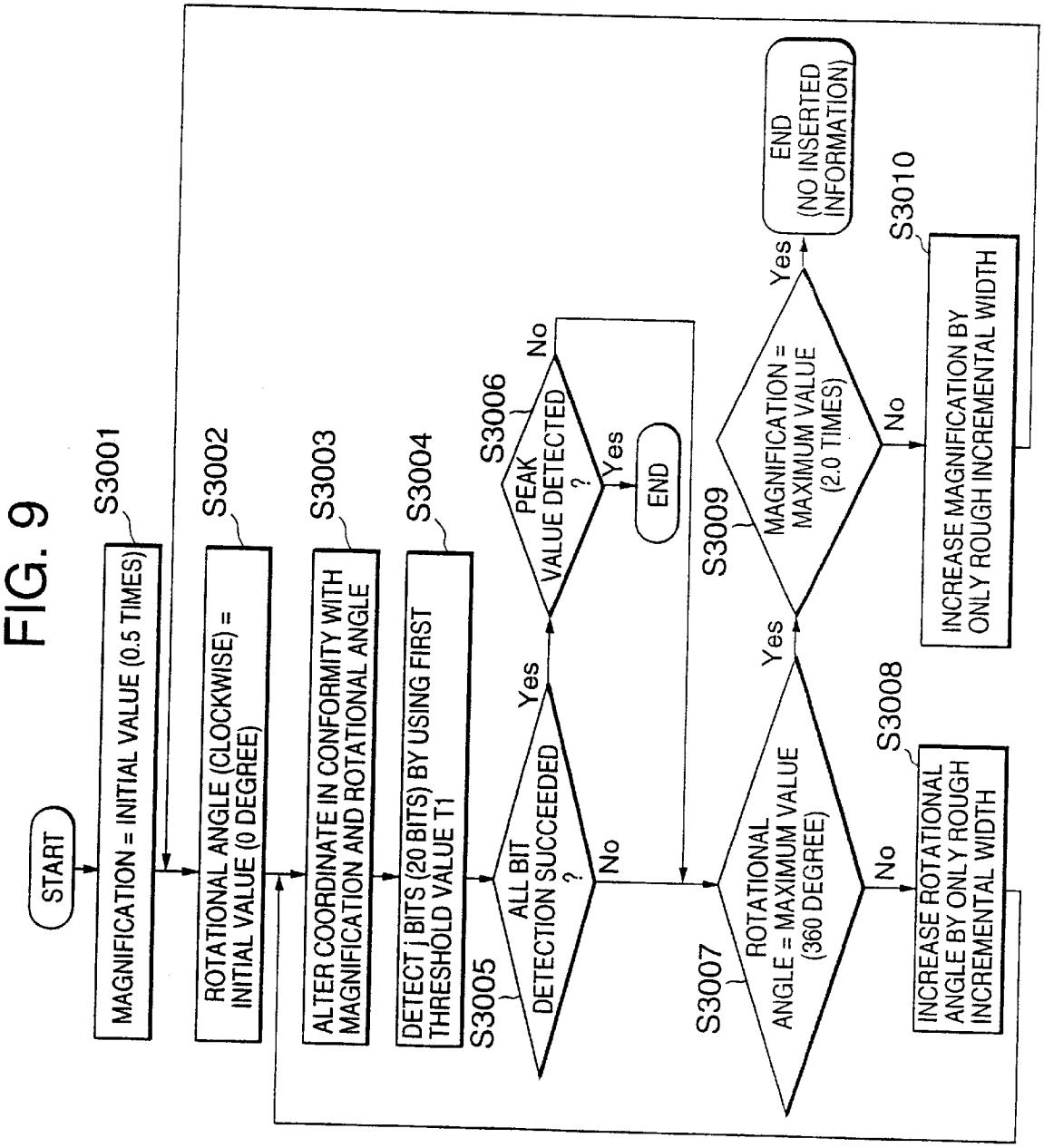
FIG. 9 is a flowchart showing the operation of the rough size/position matching unit 504 according to the second embodiment of the present invention.

FIG. 9 is a flowchart showing the operation of the rough size/position matching unit 504 of this embodiment. This flow is started when the controller 503 holds image data having information of bits $b_1$ to $b_n$ constituting digital watermark information embedded therein into the information-inserted image holder 508 in cooperation with the input/output unit 502.

First, the rough size/position matching unit 504 sets the magnification to an initial value (for example, 0.5 times) (step S3001), and then sets the rotational angle to an initial value (for example, 0 degree)(step S3002). Subsequently, the rough size/position matching unit 504 deforms a specific X-Y coordinate (which is used when the digital watermark information is embedded and is known) according to the magnification and the rotational angle thus set (step S3003).

For each of bits of j (for example, 20 bits of $b_1$ to $b_{20}$) of the bits $b_1$ to $b_n$ constituting the digital watermark information, the rough size/position matching unit 504 extracts the pixel data located at the predetermined positions 1 to m on the deformed X-Y coordinate (it is assumed that the predetermined positions are beforehand notified by a person who embeds the digital watermark information, for example), calculates the differential value S–R between the sum S of the brightness values of the extracted pixel data and the sum R of the brightness values of pixel data adjacent to the extracted pixel data, and then compares the differential value S–R with the first threshold value $T_1$ held in the rough threshold value holder 510, thereby judging whether bit data are embedded in the extracted pixel data (step S3004). If it is confirmed for all the bits of j that the bit data concerned are embedded in the extracted pixel data (step S3005), it is judged whether the peak value of the sum of the absolute values of the differential values S–R calculated for the respective bits of j is detected or not (step S3006).

If the peak value is detected in the step S3006, the magnification and the rotational angle set at the time when the peak value is detected is determined as the magnification and the rotational angle to specify the rough size and rotational angle of the X-Y coordinate used to extract the pixel data having the digital watermark information $b_1$ to $b_n$ from the image data, and then the processing is finished.

If it is not confirmed for all the bits of j in the step S3005 that the bit data concerned are embedded in the extracted pixel data, and if it is judged in step S3006 that any peak value has not yet been detected, the processing goes to step S3007. In step S3007, the rough size/position matching unit 504 judges whether the set rotational angle reaches the maximum value (for example, 360 degrees). If it does not reach the maximum value, the set rotational angle is increased by only an incremental width (for example, 3 degrees) held in the rough incremental width holder 509 (step S3008), and then the processing returns to step S3003. On the other hand, if it reaches the maximum value, it is judged the set magnification reaches the maximum value (for example, two times) (step S3009). If it does not reach the maximum value, the set magnification is increased by only an incremental width (for example, 3%) held in the rough incremental width holder 509 (step S3010), and then the processing returns to step S3003.

The magnification and the rotational angle held by the rough incremental width holder 509 may, in some cases, be determined by the positions of the pixel data where the watermark is embedded or the watermark pattern as stated above. More particularly, even when the positions of the deformation made in the pixel data are deviated from the detecting positions of the pixel data for detection of the embedded information, the magnification and the rotational angle can be enlarged within a range the embedded watermark information can be detected from the image data.

On the other hand, if the set magnification reaches the maximum value, it is judged that any digital watermark information is not embedded in the image data, and the processing is finished.

Next, the operation of the detailed size/position matching unit 505 of this embodiment will be described.

Figure 10:
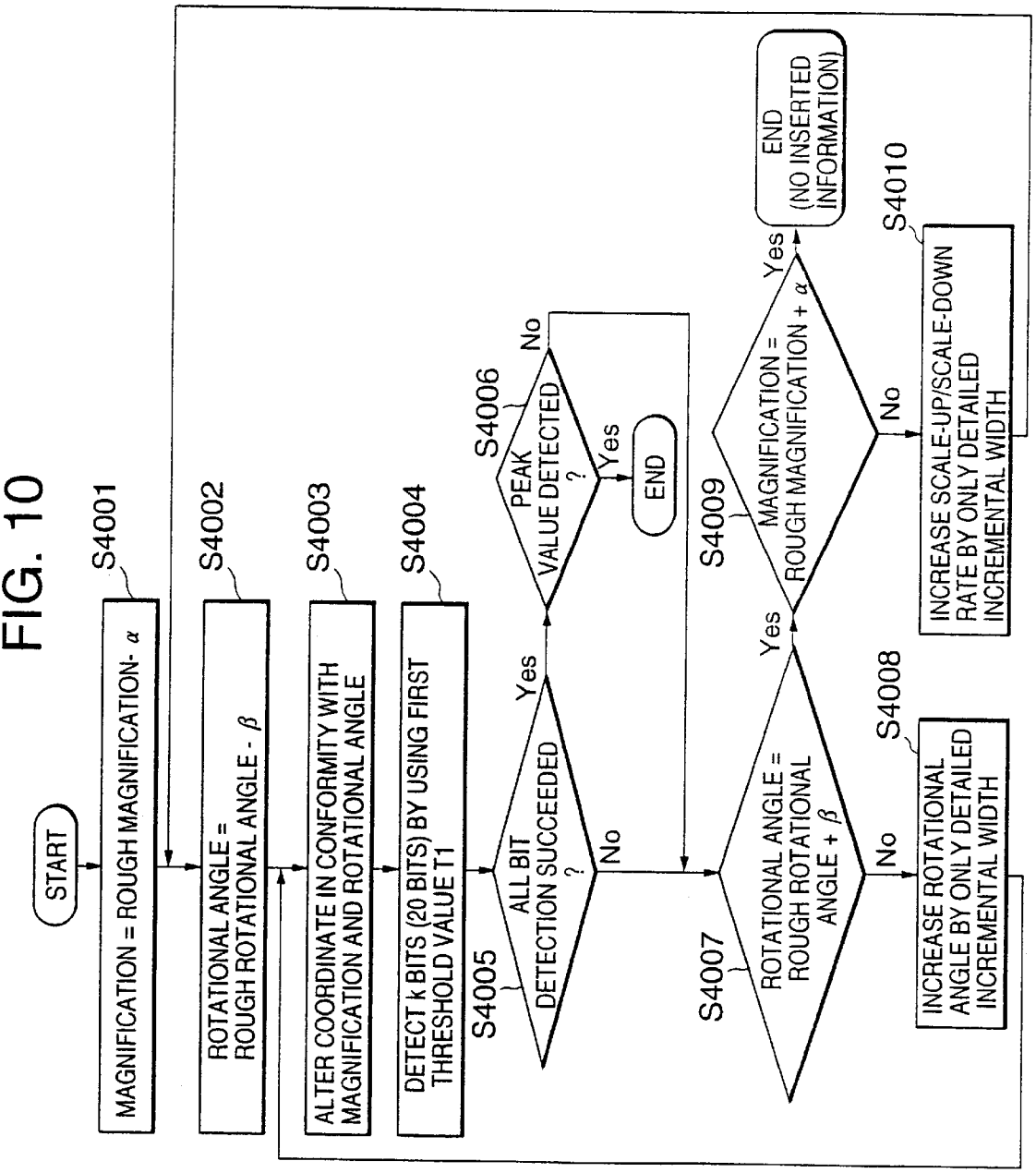
FIG. 10 is a flowchart showing the operation of the detailed size/position matching unit 504 according to the second embodiment of the present invention.

FIG. 10 is a flowchart showing the operation of the detailed size/position matching unit 505 of this embodiment. This flow is started at the time when the rough size/position matching unit 504 determines the magnification and the rotational angle to specify the rough size and rotational angle of the X-Y coordinate through the flow of FIG. 9.

First, the detailed size/position matching unit 505 sets the magnification to the rough magnification determined in the rough size/position matching unit 504–α (α is assumed to be the same as the incremental magnification held in the rough incremental rough width holder 509) (step S4001), and then sets the rotational angle to the rough rotational angle determined in the rough size/position matching unit 504–β (β is assumed to be the same as the incremental rotational angle held in the rough incremental width holder 509, for example) (step S4002). Subsequently, the detailed size/position matching unit 505 deforms the X-Y coordinate used in the process of embedding the digital watermark information according to the magnification and the rotational angle thus set (step S4003).

Subsequently, for each of bits of k (for example, 20 bits of $b_{21}$ to $b_{40}$) of the bits $b_1$ to $b_n$ constituting the digital watermark information, the detailed size/position matching unit 505 extracts pixel data located at predetermined positions 1 to m on the deformed X-Y coordinate, the differential value S–R between the sum S of the brightness values of the extracted pixel data and the sum R of the brightness values of pixel data adjacent to the extracted pixel data is calculated, and then the differential value S–R thus calculated is compared with the first threshold value $T_1$ held in the rough threshold value holder 510, thereby judging whether bit data are embedded in the extracted pixel data (step S4004). If it is confirmed for all the bits of k that the bit data are embedded in the extracted pixel data (step S4005), it is judged whether the peak value of the sum of the absolute values of the differential values S–R calculated for the is respective bits of k is detected (step S4006). If the peak value is detected, the magnification and the rotational angle set at the time when the peak value is detected are settled as the magnification and the rotational angle to specify the detailed size and rotational angle of the X-Y coordinate used when the pixel data having the digital watermark information $b_1$ to $b_n$ embedded therein are extracted from the image data, and then the processing is finished.

If it is not confirmed for all the bits of k in step S4005 that the bit data concerned are embedded in the extracted pixel data, and if it is judged in step S4006 that any peak value has not yet been detected, the processing goes to step S4007. In step S4007, the detailed size/position matching unit 505 judges whether the set rotational angle reaches to the rough rotational angle determined in the rough size/position matching unit 504+β. If it does not reach the rough rotational angle+β, the set rotational angle is increased by an incremental width (for example, 1 degree) which is held in the detailed incremental width holder 511 and is smaller than the incremental width held in the rough incremental width holder 509 (step S4008), and then the processing returns to step S4003. On the other hand, if it reaches the rough rotational angle+β, it is judged whether the set magnification reaches the rough magnification determined in the rough size/position matching unit 504+α (step S4009). If it does not reach the rough magnification+α, the set magnification is increased by only an incremental width (for example, 1%) which is held in the detailed incremental width holder 511 and is smaller than the incremental width held in the rough incremental width holder 509 (step S4010), and then the processing returns to step S4002.

On the other hand, if the set magnification reaches the rough magnification+α, it is judged that no digital watermark information is embedded in the image data concerned, and thus the processing is finished.

When the magnification and the rotational angle to specify the detailed size and rotational angle of the X-Y coordinate used to extract the pixel data having the digital watermark information $b_1$ to $b_n$ from the image data are determined in the detailed size/position matching unit 505 through the flow of FIG. 10, the image restoring unit 506 deforms the image data held in the information-inserted image holder 508 on the basis of the magnification and the rotational angle according to the magnification and the rotational angle thus determined, and restores the image data before the geometrical deformation is applied thereto. For example, assuming that the magnification thus determined is equal to 0.5 times and the rotational angle thus determined is equal to 45 degrees, the image data held in the information-inserted image holder 508 are deformed by a magnification of two times and a rotational angle of −45 degrees to restore the image data to the original image data before the geometrical deformation is applied.

Subsequently, for each of the bits $b_1$ to $b_n$ constituting the digital watermark information, the watermark detector 507 extracts from the image data restored in the image restoring unit 506 pixel data located at predetermined positions 1 to m on the X-Y coordinate (X-Y coordinate which is not deformed) used to extract pixel data having the digital watermark information $b_1$ to $b_n$ embedded therein, calculates the differential value S−R between the sum S of the brightness values of the pixel data thus extracted and the sum R of the brightness values of pixel data adjacent to the extracted pixel data, and then compares the differential value S−R thus calculated with a second threshold value $T_2$ which is held in the detailed threshold value holder 512 and whose absolute value is larger than the first threshold value $T_1$, thereby judging the value of the bit data. Further, the watermark detector 507 holds the digital watermark information thus extracted into the detection information holder 513. This information is output through the input/output unit 502 and given to the operator.

The above-described second embodiment has the same effect as the first embodiment. In addition, according to the second embodiment, the check of the embedding position of the digital watermark information can be performed without applying any geometrical deformation to the image data itself, so that the memory capacity required for the processing and the load imposed on the process can be more greatly reduced as compared with the first embodiment.

Further, according to the second embodiment, when the magnification and the rotational angle to specify the detailed size and rotational angle of the X-Y coordinate used to extract the pixel data having the digital watermark information $b_1$ to $b_n$ from the image data are determined in the detailed size/position matching unit 505, the image restoring unit 506 deforms the image data held in the information-inserted image holder 508 on the basis of the magnification and the rotational angle according to the magnification and the rotational angle thus determined, and restores the image data before the geometrical deformation is applied. Thereafter, in the watermark detector 507, the digital watermark information is extracted from the original (non-deformed) image data thus restored.

Usually, when the image data are scaled down, the size of the image data is reduced by removing any pixel data from the image data. Therefore, when the image data having the digital watermark information embedded therein is subjected to the scale-down processing, there is a probability that the pixel data having (a part of) the digital watermark information embedded therein are removed from the image data in the scale-down processing. In such a case, it may be considered that all the digital watermark information cannot be efficiently extracted from the image data concerned.

On the other hand, in this embodiment, when the image data are scaled down, the image data are deformed by the magnification corresponding to the magnification to specify the detailed size of the X-Y coordinate determined in the detailed size/position matching unit 505 to scale up the image data concerned to the size before the geometrical deformation is applied. Usually, the scale-up of the image data is performed by interpolation.

In the first and second embodiments, it is assumed that the embedding of each of the bits $b_1$ to $b_n$ constituting the digital watermark information into the image data is performed by embedding each of the bits into each pixel data located at each of predetermined positions on a specific X-Y coordinate. However, in many cases, each of the bits is frequently embedded into pixel data of N×M located at predetermined positions 1 to m on a specific X-Y coordinate. In such a case, according to the second embodiment of the present invention, even when one of the pixel data of N×M in which bit data are embedded is lost during the scale-down process of the image data, the interpolation is performed on the basis of the remaining pixel data having the bit data embedded therein when the image data are scaled up, so that there is a high probability that the pixel data in which the bit data lost in the scale-down process are embedded could be restored. Therefore, according to the second embodiment, the detection precision of the bits $b_1$ to $b_n$ constituting the digital watermark information can be enhanced.

In the first and second embodiments, for each of 20 bits out of the bits $b_1$ to $b_n$ constituting the digital watermark information, it is judged whether the bit data of the bit concerned is embedded in pixel data located at the predetermined positions 1 to m on the X-Y coordinate, thereby specifying the size and rotational angle of the image data or the X-Y coordinate which are requested to detect the digital watermark information $b_1$ to $b_n$. However, the present invention is not limited to this mode.

For example, for any one of the bits $b_1$ to $b_n$ constituting the digital watermark information, it may be judged whether the bit data of the bit concerned is embedded in the pixel data located at the predetermined positions 1 to m on the X-Y coordinate, thereby specifying the size and rotational angle of the image data or the X-Y coordinate which are requested to detect the digital watermark information $b_1$ to $b_n$. Alternatively, for each of the bits $b_1$ to $b_n$ constituting the digital watermark information, it may be judged whether the bit data of the bit concerned is embedded in pixel data located at the predetermined positions 1 to m on the X-Y coordinate, thereby specifying the size and rotational angle of the image data or the X-Y coordinate which are requested to detect the digital watermark information $b_1$ to $b_n$.

In the former case, if the first threshold value $T_1$ to judge whether the bit data are embedded is more strictly settled, the check of the pixel data having the digital watermark information embedded therein could be more efficiently and quickly performed. For example, in a case where the first threshold value $T_1$ is set so that each of the bits constituting the digital watermark information can be detected with an error rate of about $10^{-8}$, if the number n of bits constituting the digital watermark information is equal to 50, the probability that it would be erroneously judged that any one of the bits $b_1$ to $b_{50}$ can be detected is equal to $10^{-8}$, and this value means that there is no practical problem.

Further, in the latter case, if the first threshold value $T_1$ used to judge whether bit data are embedded in pixel data is more moderately set, the check of the pixel data having the digital watermark information embedded therein can be more efficiently and quickly performed. For example, in a case where the first threshold value $T_1$ is set so that each of the bits constituting the digital watermark information can be detected with an error rate of about $10^{-1}$, if the number of bits constituting the digital watermark information is equal to 50, the probability that it would be erroneously judged that all the bits $b_1$ to $b_{50}$ can be detected is equal to $10^{-50}$, and this means that there is no practical problem.

In the first and second embodiments, the differential value between the sum R of the brightness values of plural pixel data located at predetermined positions on the X-Y coordinate and the sum R of pixel data adjacent to the plural pixel data (here, the sum R is used as a reference value to calculate the differential value) is calculated. However, the present invention is not limited to this reference value. For example, the sum R' of brightness values of pixel data each of which is interpolatively determined on the basis of plural pixel data located in the neighborhood of each of the plural pixel data may be used as the reference value. In this case, the digital watermark information can be extracted with higher precision.

Next, a third embodiment according to the present invention will be described.

In the first and second embodiments, the second threshold value $T_2$ used for the judgment of the bits constituting the digital watermark information in the watermark detector 507 is set to be larger than the first threshold value $T_1$ used for specifying the embedding positions of the bits $b_1$ to $b_n$ constituting the digital watermark information. Further, in the watermark detector 507, the pixel data located at the embedding positions 1 to m specified for the respective bits $b_{1-n}$ constituting the digital watermark information are extracted, the differential value S-R between the sum S of the brightness values of the pixel data and the sum R of the brightness values of the pixel data adjacent to the extracted pixel data is calculated, and then if S-R$\geq T_2$, the bit concerned is judged as "1", if S-R$\leq -T_2$, the bit concerned is judged as "0", and if $-T_2$<S-R<$T_2$, it is judged that no bit is embedded in the extracted pixel data.

Therefore, if the second threshold value $T_2$ is not optimized to the image data from which the digital watermark information is to be extracted, the inequality: $-T_2$<S-R<$T_2$ is satisfied although the bits $b_i$ ($1 \leq i \leq n$) constituting the digital watermark information are embedded in the predetermined positions 1 to m of the image data, so that it may be judged that no bit $b_i$ is embedded in the image data. That is, the extraction sensitivity of the bits $b_1$ to $b_n$ constituting the digital watermark information is lowered.

Therefore, according to the present invention, in the watermark detector 507, the second threshold value $T_2$ used for the judgement of the bits $b_1$ to $b_n$ constituting the digital watermark information is set to zero, whereby each of the bits $b_1$ to $b_n$ constituting the digital watermark information embedded in the image data is set so as to be necessarily judged as "0" or "1". In connection with this setting, prior to the bit value judgment of each of the bits $b_1$ to $b_n$ constituting the digital watermark information embedded in the image data, the error rate of the bit value judgment of the bits $b_1$ to $b_n$ constituting the digital watermark information embedded in the image data when the second threshold value $T_2$ is set to zero is calculated. In this case, only when the error rate is equal to or less than a predetermined value, that is, the reliability of the bit value judgment is equal to or more than a predetermined value, the bit value judgment is carried out.

Next, the digital watermark information extracting device to which this embodiment is applied will be described.

In the digital watermark information extracting device to which this embodiment is applied, only the function of the watermark detector 507 is different from that of the first and second embodiment in FIG. 3, except that the second threshold value $T_2$ held in the detailed threshold value holder 512 is equal to zero. The hardware configuration thereof is the same as shown in FIG. 4. Therefore, only the watermark detector 507 of this embodiment will be described.

Figure 11:
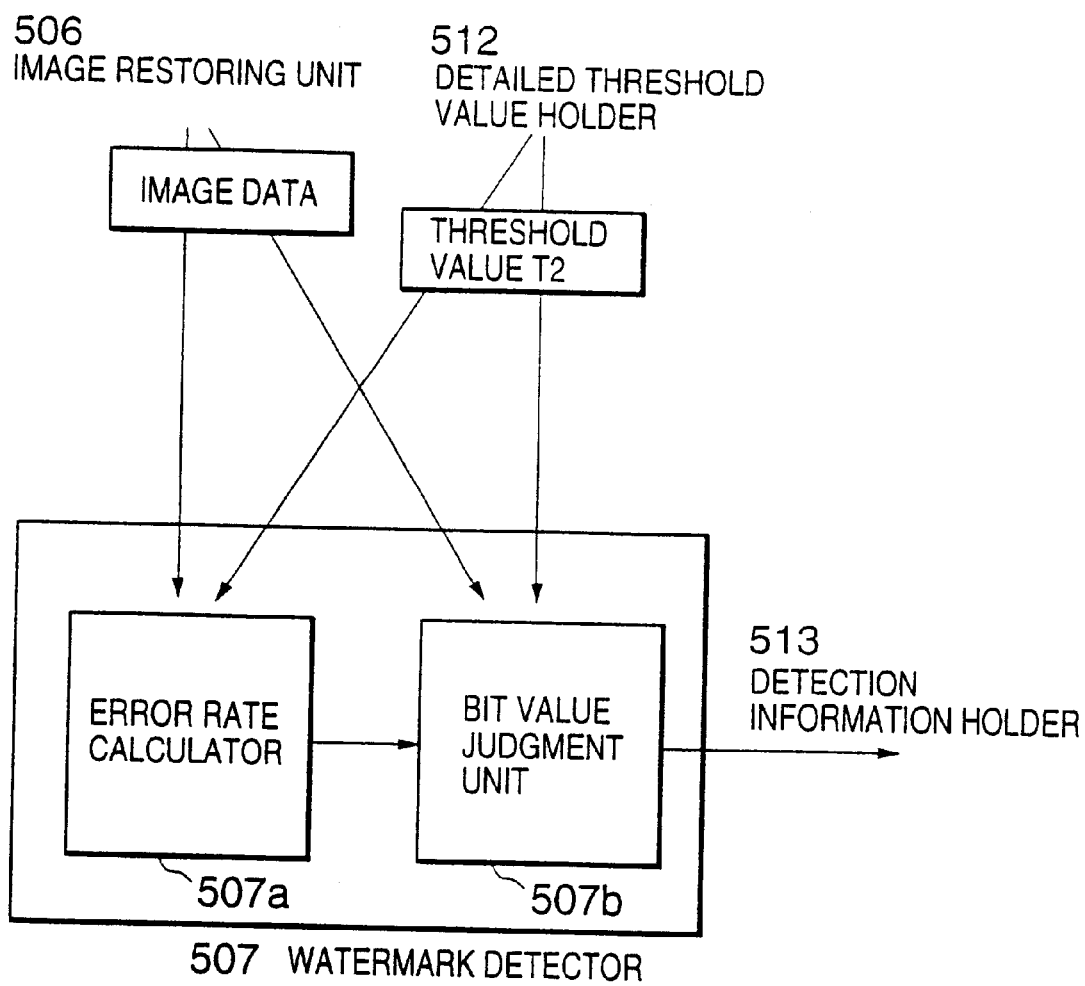
FIG. 11 is a functional diagram showing a watermark detector 507 used in a third embodiment of the present invention.

FIG. 11 is a functional diagram showing the watermark detector 507 used in the third embodiment of the present invention. As shown in FIG. 11, the watermark detector 507 used in this embodiment has an error calculator 507a and a bit value judgment unit 507b.

The error rate calculator 507a extracts from the image data restored in the image restoring unit 506 pixel data located at predetermined positions 1 to m on the X-Y coordinate for each of bits of h (for example, 20 bits of $b_1$ to $b_{20}$) out of the bits $b_1$ to $b_n$ constituting the digital watermark information, and then calculates the differential value S-R between the S of the brightness values of the pixel data thus extracted and the sum R of the brightness values of pixel data adjacent to the extracted pixel data. The h differential values S-R calculated for the respective bits of h are classified into two subset on the basis of the second threshold value $T_2$ (=0) serving as the boundary, that is, on the basis of the positive or negative value of each differential value S-R. Thereafter, for each of the two subset, a probability distribution curve of differential values S-R is determined on the basis of a statistic value such as the average value or dispersion value of the differential values S-R contained in the subset or a histogram distribution thereof. Thereafter, a bit value judgment error is calculated from at least one probability distribution curve of the positive and negative two subsets thus determined.

Figure 12A:
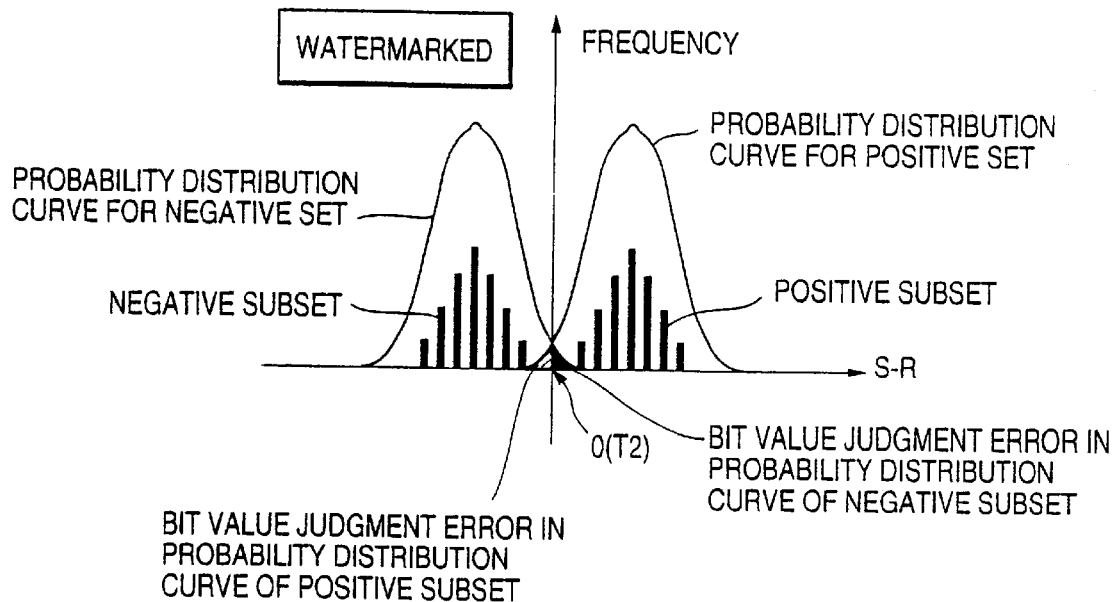
FIG. 12A is a diagram showing the probability distribution curve of differential value S–R in a case where digital watermark information is embedded.

FIG. 12A shows the probability distribution curve of the differential values S-R thus calculated. In this embodiment, the embedding positions at which the bits $b_1$ to $b_n$ constituting the digital watermark information are embedded in the image data are specified along the first and second embodiments, and thus the differential values S-R calculated for each of the bits of h (for example, 20 bits of $b_1$ to $b_{20}$) out of the bits $b_1$ to $b_n$ constituting the digital watermark information is classified into positive and negative two subsets. Accordingly, the bit value judgment error rate can be calculated from the probability distribution curves of these positive and negative two subsets. For example, the probability that a bit which is originally "1" is erroneously judged as "0" can be calculated as the rate of the negative area (an area (oblique-line portion) smaller than the threshold value $T_2$ (0)) in the probability distribution curve of the positive subset in FIG. 12A. Further, the probability that a bit which is originally "0" is erroneously judged as "1" can be calculated as the rate of the positive area (an area (painted portion) larger than the threshold value $T_2$=0) in the probability distribution curve of the negative subset.

Figure 12B:
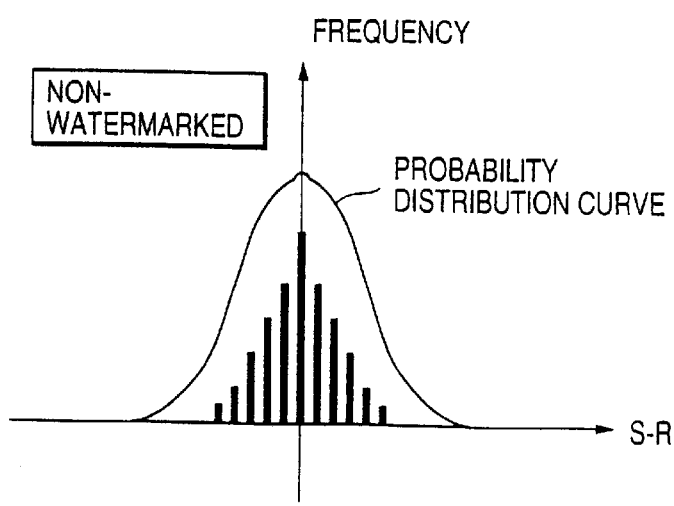
FIG. 12B is a diagram showing the probability distribution curve of differential value S–R in a case where digital watermark information is not embedded.

For reference, the probability distribution curve of the differential values S-R when no digital watermark information is embedded is shown in FIG. 12B. In this case, the probability distribution curve of the differential values S-R as shown in FIG. 12B becomes a distribution including 0 as a center point.

When the bit value judgment error rate calculated in the error rate calculator 507a is below a predetermined value (the predetermined value is set according to the reliability requested to the digital watermark information to be extracted, and it is set to $10^{-3}$, for example), for each of the bits $b_1$ to $b_n$ constituting the digital watermark information, the bit value judgment unit 507b extracts from the image data restored in the image restoring unit 506 pixel data located at predetermined positions 1 to m on the X-Y coordinate used when the digital watermark information is embedded, calculates the differential value S–R between the sum S of the brightness values of the extracted pixel data and the sum R of the brightness values of pixel data adjacent to the extracted pixel data, and then compares the differential value S–R thus calculated with the second threshold value $T_2$ (i.e., 0) held in the detailed threshold value holder 512, thereby judging the value of the bit data. Specifically, if S–R is positive, the bit concerned is judged as "1", and if S–R is negative, the bit concerned is judged as "0".

Figure 13:
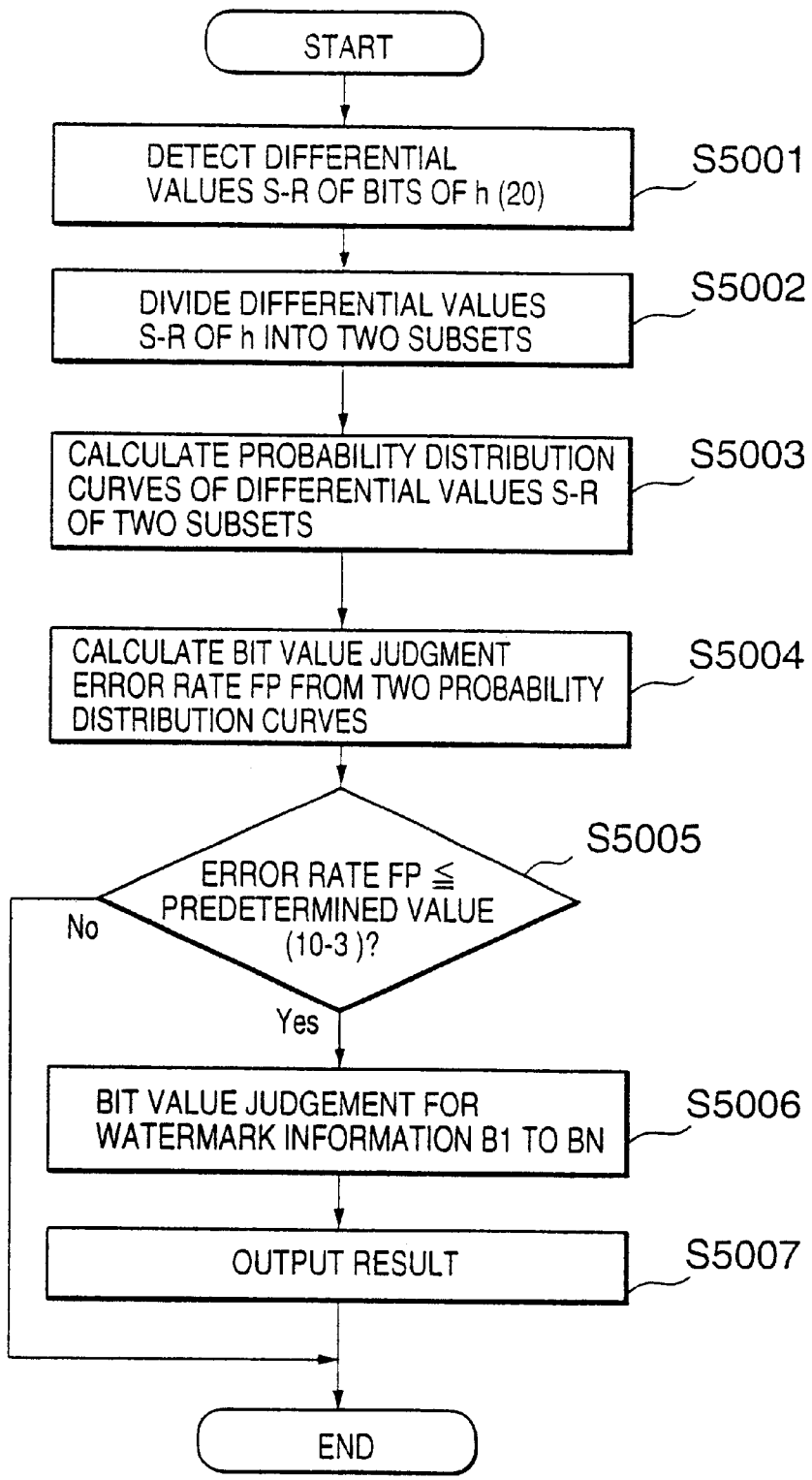
FIG. 13 is a flowchart showing the operation of the watermark detector 507 used in the third embodiment of the present invention.

FIG. 13 is a flowchart showing the operation of the watermark detector 507 used in the third embodiment of the present invention.

This flow is started at the time when through the flow of FIG. 6 the magnification and the rotational angle to specify the detailed size and rotational angle of the image data are determined in the detailed size/position matching unit 505 and the image data held in the information-inserted image holder 508 are deformed by the magnification and the rotational angle thus determined to be restored to the image data in the image restoring unit 506 before the geometrical deformation is applied thereto, or at the time when through the flow of FIG. 10 the magnification and the rotational angle to specify the detailed size and rotational angle of the X-Y coordinate used to extract from the image data the pixel data having the digital watermark information $b_1$ to $b_n$ embedded therein are specified in the detailed size/position matching unit 505, and the image data held in the information-inserted image holder 508 are deformed by the magnification and the rotational angle according to the magnification and the rotational angle thus determined to be restored to the image data before the geometrical deformation is applied thereto.

First, for each of bits of h (for example, 20 bits of $b_1$ to $b_{20}$) out of the bits $b_1$ to $b_n$ constituting the digital watermark information, the error rate calculator 507a extracts pixel data located at predetermined positions 1 to m on an X-Y coordinate from the image data restored in the image restoring unit 506, and then calculates the differential value S–R between the sum S of the brightness values of the pixel data thus extracted and the sum R of the brightness values of pixel data adjacent to the extracted pixel data (step S5001). Subsequently, the differential values S–R of h thus calculated are classified into two subsets in accordance with the positive or negative sign thereof (step S5002). Thereafter, the average E and the dispersion V of the differential values S–R for each of the two subsets are calculated, and then the probability distribution curve of the differential values S–R for each of the two subsets is determined from the average E and the dispersion V thus calculated (step S5003).

Subsequently, the error rate calculator 507a calculates a bit value judgment error rate FP from the two probability distribution curves thus determined (step S5004). Specifically, the probability FP that a bit which is originally "1" is erroneously judged as "0" is calculated as the rate of a negative area (an oblique-line portion smaller than the threshold value $T_2$=0) in the probability distribution curve of the positive subset in FIG. 12A. Further, the probability FP that a bit which is originally "0" is erroneously judged as "1" is calculated as the rate of a positive area (a painted portion larger than the threshold value $T_2$=0) in the probability distribution curve of the negative subset in FIG. 12A.

Subsequently, the error rate calculator 507a confirms that both the bit value judgment error rates FP thus calculated are equal to or less than a predetermined value (for example, $10^{-3}$) ((step S5005), and the processing goes to step S5006. If one of both the bit value judgment error rates FP is larger than the predetermined value (step S5005), it is judged that the bit value judgment cannot be performed with requested reliability, and thus the processing is finished.

In step S5006, for each of the bits $b_1$ to $b_n$ constituting the digital watermark information, the bit value judgment unit 507b extracts from the image data restored in the image restoring unit 506 pixel data located at predetermined positions 1 to m on the X-Y coordinate used when the digital watermark information is embedded, calculates the differential value S–R between the sum S of the brightness values of the extracted pixel data and the sum R of the brightness values of pixel data adjacent to the extracted pixel data, and then compares the differential value S–R with the second threshold value $T_2$ (i.e., 0) held in the detailed threshold value holder 512, thereby judging the value of the bit data. Specifically, if the value of S–R is positive, the bit concerned is judged as "1", and if the value of S–R is negative, the bit concerned is judged as "0". Thereafter, the bit value judgment unit 507b outputs the bit values of the bits $b_1$ to $b_n$ constituting the digital watermark information (Step S5007).

According to the third embodiment of the present invention, the second threshold value $T_2$ used for the bit value judgment of the digital watermark information embedded in the image data is set to zero. Therefore, each of the bits $b_1$ to $b_n$ constituting the digital watermark information embedded in the image data is necessarily judged as "0" or "1", and thus the extraction sensitivity of the bits $b_1$ to $b_n$ constituting the digital watermark information embedded in the image data can be increased. Further, in this embodiment, prior to the bit value judgement of each of the bits $b_1$ to $b_n$ constituting the digital watermark information embedded in the image data, the bit value judgment error rate of the bits $b_1$ to $b_n$ constituting the digital watermark information embedded in the image data when the second threshold value $T_2$ is set to 0 is calculated, and only when the error rate is equal to or less than a predetermined value, that is, only when the reliability of the bit value judgment is equal to or more than a predetermined value, the bit value judgment is carried out. Therefore, the reliability of the bit value of the digital watermark information output from the bit value judgment unit 507b can be ensured.

Figure 14:
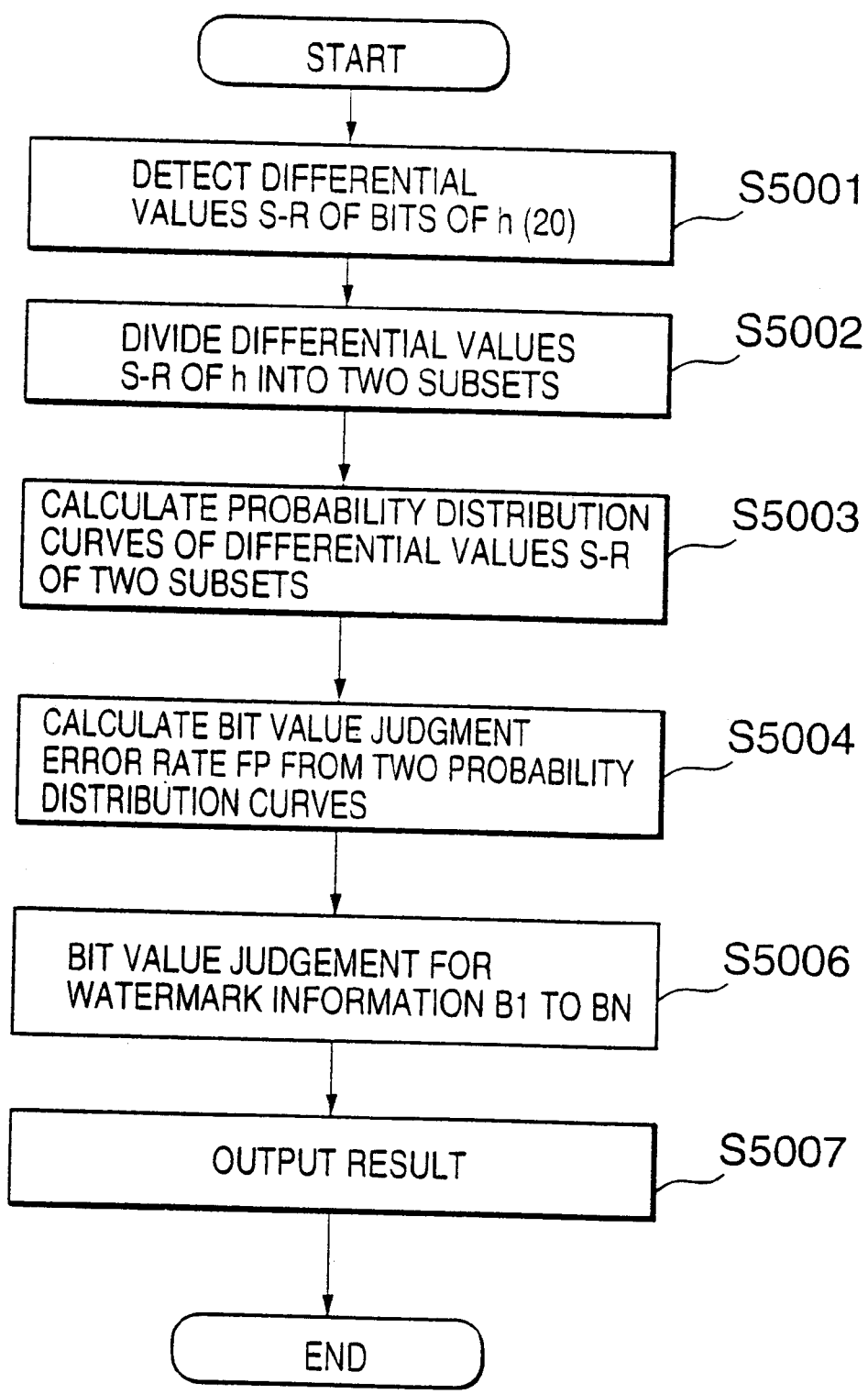
FIG. 14 is a flowchart showing a modification of the operation of the watermark detector 507 used in the third embodiment of the present invention.

In the third embodiment, the bit value judgment error rate FP of the bits $b_1$ to $b_n$ constituting the digital watermark information embedded in the image data when the second threshold value $T_2$ is set to 0 is calculated in the error rate calculator 507a, and the bit value judgment of the bits $b_1$ to $b_n$ constituting the digital watermark information embedded in the image data is carried out in the bit value judgment unit 507b only when the error rate FP is equal to or less than a predetermined value. However, irrespective of the bit value judgment error rate FP calculated in the error rate calculator 507a, the bit value judgment is carried out in the bit value judgment unit 507b. That is, as shown in the flowchart of FIG. 14, the step S5005 may be deleted from the flowchart of FIG. 13. In this case, in addition to the bit value judgement result in the bit value judgment unit 507b, the bit value judgment error rate FP (or the reliability of the bit value judgment result derived from the bit value judgment error rate FP) calculated in the error rate calculator 507a is output in step S5007. Through this processing, it can be grasped how degree the reliability of the bit value of the digital watermark information judged in the bit value judgment unit 507b is.

Further, according to the third embodiment, the second threshold value $T_2$ used for the bit value judgment of the digital watermark information embedded in the image data is set to 0 in the bit value judging unit 507*b*. However, the second threshold value $T_2$ may be set to a value other than 0. In this case, the error rate calculator 507*a* may calculate the bit value judgment error rate of the bits $b_1$ to $b_n$ constituting the digital watermark information embedded in the image data as described below.

Figure 15:
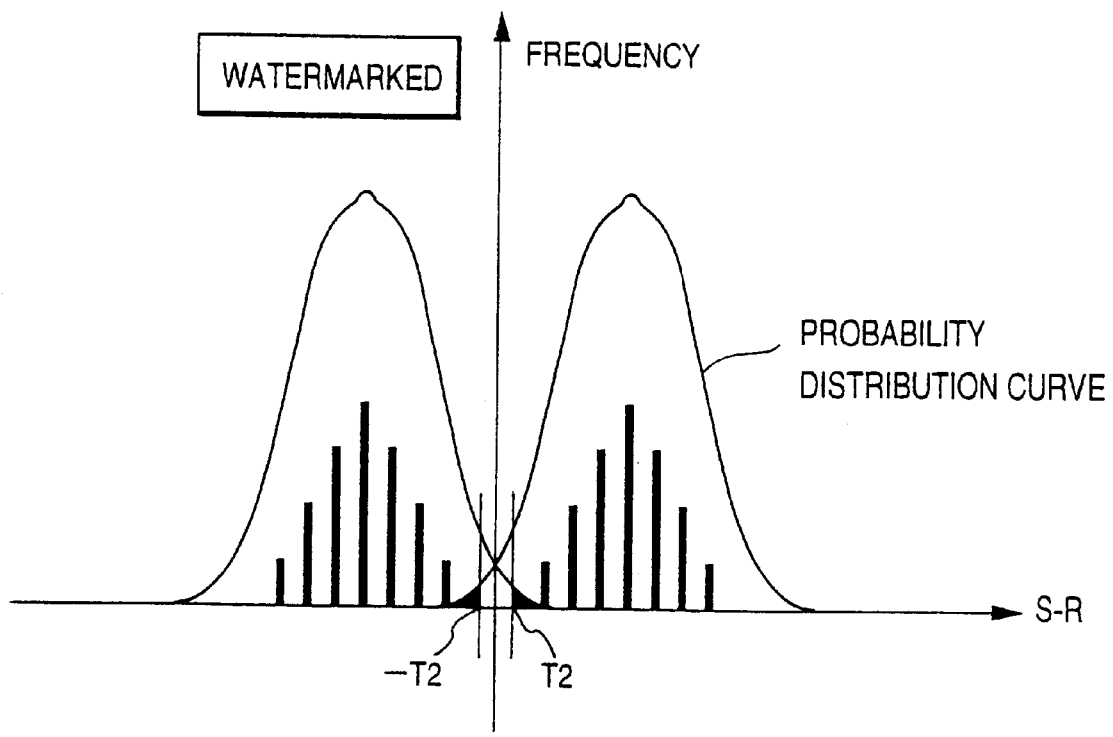
FIG. 15 is a diagram showing the probability distribution curve of the differential value S–R in a case where digital watermark information is embedded.

That is, for each of bits of h (for example, 20 bits of $b_1$ to $b_{20}$) out of the bits $b_1$ to $b_n$ constituting the digital watermark information, the pixel data located at predetermined positions 1 to m on the X-Y coordinate are extracted from the image data restored in the image restoring unit 506, and the differential value S-R between the sum S of the brightness values of the extracted pixel data and the sum R of the brightness values of pixel data adjacent to the extracted pixel data is calculated. Thereafter, the probability distribution curve of the differential S-R values is determined on the basis of the statistical value such as the average value and dispersion value of the differential values S-R of h calculated for the respective bits of h or a histogram distribution thereof, and then the bit value judgment error is calculated from the probability distribution curve thus determined. FIG. 15 shows the probability distribution curve of the differential values S-R thus determined. The bit value judgment error rate may be calculated as the rate of an area shown in black to the probability distribution curve.

The error rate calculator 507*a* of the third embodiment may be applied to a case where it is merely judged whether the watermark information is embedded in the image data.

The present invention is not limited to the above embodiments, and various modifications may be made without departing from the subject matter of the present invention.

For example, according to each of the above embodiments, in the rough size/position matching unit 504 and the detailed size/position matching unit 505, the geometrical deformation is applied to the image data held in the information-inserted image holder 508 or the X-Y coordinate for specifying the embedding position of bit data constituting the digital watermark information. Thereafter, for each of any number of bits of the bits $b_1$ to $b_n$ constituting the digital watermark information, the pixel data located at the predetermined positions 1 to m on the X-Y coordinate are extracted from the image data, the differential value S-R between the sum S of the brightness values of the extracted pixel data and the sum R of the brightness values of the pixel data adjacent to the extracted pixel data is calculated, and then the absolute value of the differential value S-R is compared with the first threshold value $T_1$ held in the rough threshold value, thereby judging whether the bit data are embedded in the extracted pixel data.

However, the present invention is not limited to the above mode. The function of the error rate calculator 507*a* described in the third embodiment may be applied to the judgment of the embedding position of the bit data in the rough size/position matching unit 504 and the detailed size/position matching unit 505.

That is, in the rough size/position matching unit 504, the image data held in the information-inserted image holder 508 or the X-Y coordinate are first reduced with a predetermined magnification. Thereafter, for each of any number of bits of the bits $b_1$ to $b_n$ constituting the digital watermark information, the pixel data located at the predetermined positions 1 to m on the X-Y coordinate are extracted, and the differential value S-R between the sum S of the brightness values of the extracted pixel data and the sum R of the brightness values of the pixel data adjacent to the extracted pixel data is calculated. Subsequently, on the basis of the statistical values such as the average value and the dispersion value of the differential values S-R thus calculated for the respective bits of any number or the histogram thereof, the probability distribution curve of the differential values S-R is determined, and then the bit value judgment error rate is calculated from the probability distribution curve. Further, a series of processing of judging whether the bit value judgment error rate is below a predetermined value or not, thereby judging whether bit data are embedded in the extracted pixel data, is performed while rotating the image data concerned or the X-Y coordinate by every first incremental rotational angle held in the rough incremental width holder 509 within a predetermined range. If it is judged that no bit data are embedded, the same processing is carried out while the image data or the X-Y coordinate is scaled up by every first incremental magnification held in the rough incremental holder 509. This processing is repetitively carried out until it is confirmed that bit data are embedded (specifically, the image data or X-Y coordinate having the size and the rotational angle at which the bit value judgment error rate thus calculated is below the predetermined value and minimum is detected).

Likewise, in the detailed size/position matching unit 505, the image data held in the information-inserted image holder 508 are scaled down with a magnification which is lower by a predetermined value than the magnification of the image data or the X-Y coordinate when it is confirmed in the rough size/position matching unit 504 that the bit data are embedded. Thereafter, for each of any number of bits of the bits $b_1$ to $b_n$ constituting the digital watermark information, the pixel data located at the predetermined positions 1 to m on the X-Y coordinate are extracted, and the differential value S-R between the sum S of the brightness values of the extracted pixel data and the sum R of the brightness values of pixel data adjacent to the extracted pixel data is calculated. Subsequently, the probability distribution curve of the differential values S-R is determined on the basis of the statistical values such as the average value and the dispersion value of the differential S-R values calculated for the respective bits of any number or the histogram thereof, and then the bit value judgment error rate is calculated from the probability distribution curve. Thereafter, a series of processing of judging whether the bit value judgment error rate thus calculated is below a predetermined value, thereby judging whether bit data are embedded in the extracted pixel data, is carried out while the image data is rotated by every second rotational angle (which is smaller than the first rotational angle and held in the detailed incremental width holder 511) within a predetermined range containing the rotational angle of the image data when it is confirmed in the rough size/position matching unit 505 that the bit data are embedded. Thereafter, if it is judged that no bit data are embedded, the same processing is carried out while the image data are scaled up by every second magnification which is held in the detailed incremental width holder 511 and smaller than the first magnification. This processing is repetitively carried out until it is confirmed that the bit data are embedded.

In each of the above embodiments, the processing of applying the geometrical deformation to the image data or the X-Y coordinate used to specify the bit position of the digital watermark information embedded in the image data (the processing in the rough size/position matching unit 504, the detailed size/position matching unit 505 and the image restoring unit 506), and the processing of judging and extracting the bit value of each bit of the digital watermark information embedded in the image data (the processing in the watermark detector 507) are carried on one device. However, the present invention is not limited to this embodiment. For example, the processing of specifying the bit position of the digital watermark information embedded in the image data and the processing of judging and extracting the bit value of each bit of the digital watermark information embedded in the image data concerned may be carried out on different devices, respectively.

Figure 16:
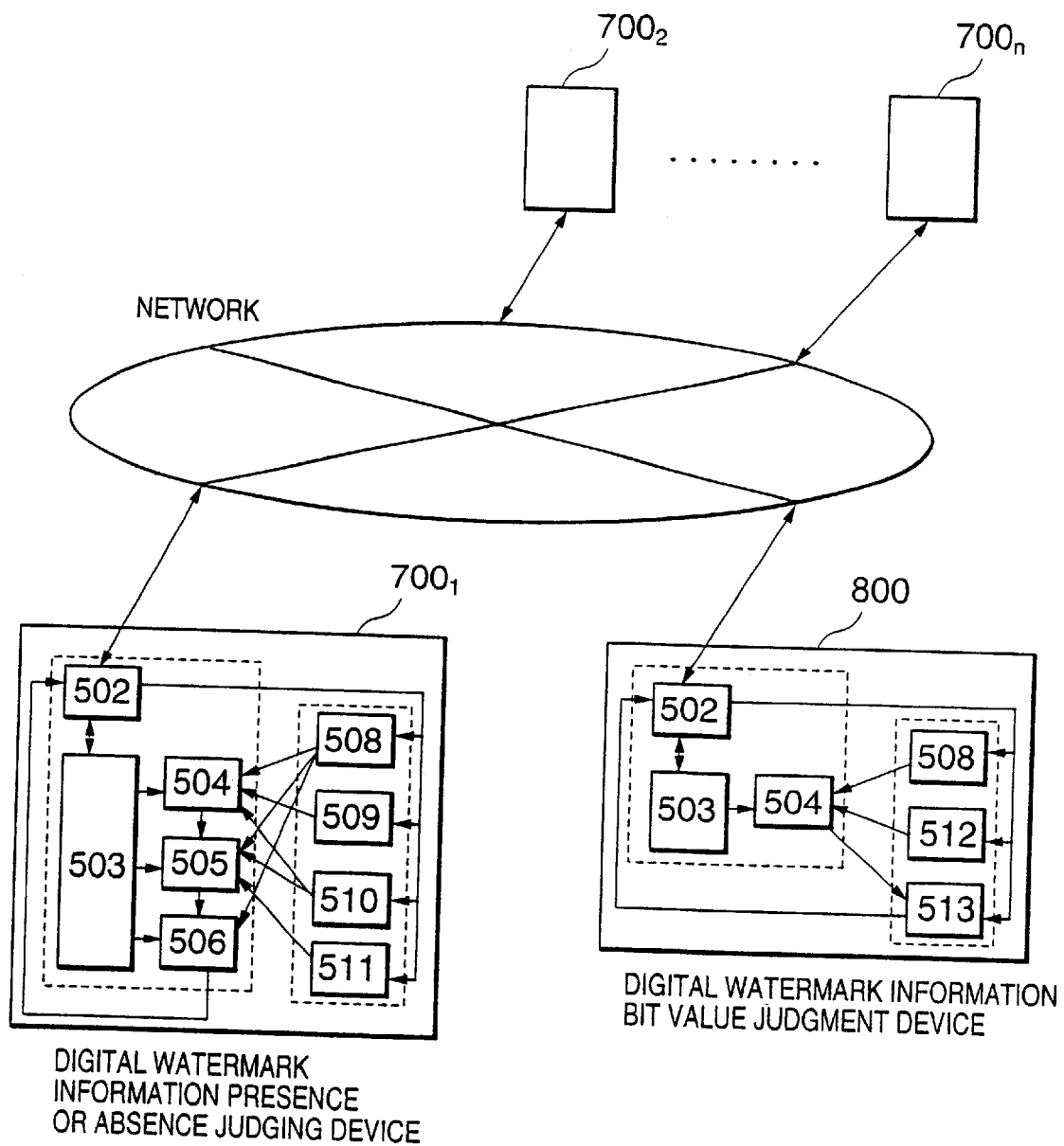
FIG. 16 is a diagram showing a modification of the first to third embodiments in which the processing of specifying the bit position value of the digital watermark information embedded in the image data and the processing of judging and extracting the bit value of each bit of the digital watermark information embedded in the image data are carried out by different devices.

FIG. 16 shows a modification in which the processing of specifying the bit position of the digital watermark information embedded in the image data and the processing of judging and extracting the bit value of each bit of the digital watermark information embedded in the image data in each of the above embodiments are carried out on different devices. In FIG. 16, the elements having the same functions as shown in FIG. 3 are represented by reference numerals.

In FIG. 16, digital watermark information presence or absence judging devices $700_1$ to $700_n$ serve to perform the processing of specifying the bit position of digital watermark information embedded in image data, and each device is designed to have such a structure that the watermark detector 507, the detailed threshold value holder 512 and the detection information holder 513 are omitted from the digital watermark information extracting device shown in FIG. 3. The digital watermark information bit judgment device 800 serves to perform the processing of judging and extracting the bit value of each bit of the digital watermark information embedded in the image data, and it is designed so as to have such a structure that the rough size/position matching unit 504, the detailed size/position matching unit 505, the image restoring unit 506, the rough incremental width holder 509, the detailed incremental width holder 511 and the rough threshold value holder 510 are removed from the digital watermark information extracting device shown in FIG. 3. The digital watermark information presence or absence judgment devices $700_1$ to $700_n$ and the digital watermark information bit judgment device 800 are mutually connected to each other through a network.

Each of the digital watermark information presence or absence judging devices $700_1$ to $700_n$ specifies the embedding position of the digital watermark information for the image data held therein according to the flow shown in FIGS. 5 and 6 or FIGS. 9 and 10. The image data for which the embedding position is specified (that is, the image data for which the presence of the digital watermark information is judged) are restored to the original state by the image restoring unit 506, and then transmitted from the image restoring unit 506 through the input/output unit 502 and the network to the digital watermark information bit value judgment device 800.

Upon receiving the image data from the digital watermark information presence or absence judgment devices $700_1$ to $700_n$, the digital watermark information bit value judgment device 800 performs the bit value judgment of the digital watermark information embedded in the image data, and transmits the judgment result through the input/output unit 502 and the network to the digital watermark information presence or absence judgment devices $700_1$ to $700_n$ which are transmission destinations of the image data.

The above configuration is suitable for the judgment of the watermark information of the image data supplied from plural Web servers connected to the Internet. In this case, each of the digital watermark information presence or absence judgment devices $700_1$ to $700_n$ is built up on the Web server. A program for building up the digital watermark information presence or absence judgment devices on the Web server may be supplied in a so-called agent style in which the program is successively shifted onto plural information processors through the network, and executed on the information processor serving as each shift destination.

Figure 17:
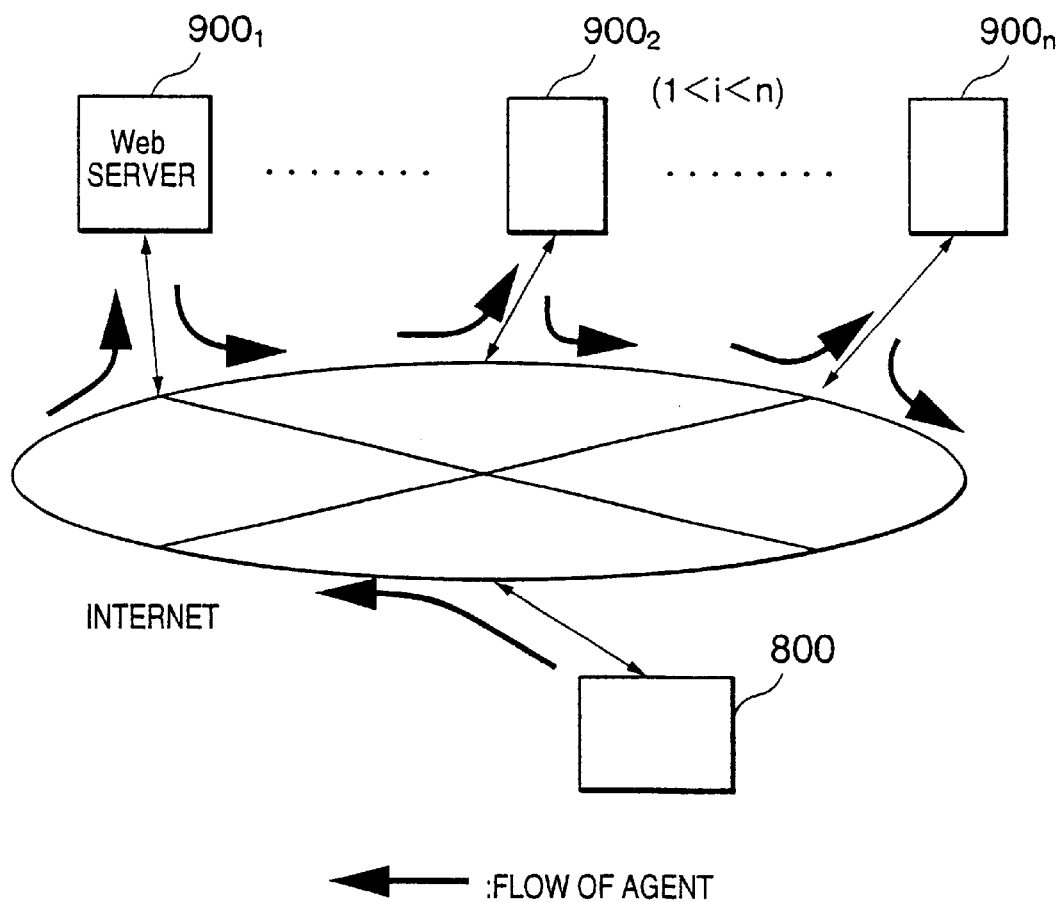
FIG. 17 is a diagram showing a system when a program to build up a digital watermark information presence or absence judging device shown in FIG. 16 is supplied in a style which is so-called agent.

FIG. 17 shows a system when the program for building up the digital watermark information presence or absence judgment device shown in FIG. 16 on the Web server is supplied in a so-called agent style.

In FIG. 17, the digital watermark information bit value judgment device 800 has an agent program for building up the digital watermark information presence or absence judgment device shown in FIG. 16 on Web servers $900_1$ to $900_n$, and transmits the agent program onto the network periodically or at the time when a predetermined event occurs. The agent program transmitted onto the network is shifted onto the Web servers $900_1$ to $900_n$ in predetermined order. For example, it is first shifted onto the Web server $900_1$, and executed thereon to build up the digital watermark information presence or absence judgment device $700_1$. Thereafter, the embedding position of the digital watermark information is carried out for the image data held in the Web server $900_1$ according to the flow of FIGS. 5 and 6 or FIGS. 9 and 10. The image data for which the embedding position is specified (that is, the image data for which the presence of the digital watermark information is judged) are restored to the original state, and transmitted to the digital watermark information bit value judgment device 800 to wait until it receives the bit value judgment result of the digital watermark information embedded in the image data concerned.

When the bit value judgment result is received from the digital watermark information bit value judgment device 800 or when the embedding position is not specified and thus the absence of the digital watermark information is judged, the agent program is shifted through the network onto the next Web server. The agent program is successively shifted on the Web servers $900_1$ to $900_n$ to perform the above processing.

As described above, according to the present invention, the digital watermark information can be extracted from the geometrically-deformed image data without using any calibrating digital watermark. Further, even when the extraction sensitivity of the bits constituting the digital watermark information is increased, it can be grasped whether the bit value of the extracted digital watermark information can be relied on.

What is claimed is:

1. A digital watermark information extracting method in which digital watermark information is extracted from image data which has the digital watermark information embedded therein by altering at least one pixel data located at a predetermined position on a specific coordinate end is geometrically deformed, comprising:

an embedding position check step of performing the processing of extracting at least one pixel data at a predetermined position on the specific coordinate from the image data and comparing the data value of the pixel data thus extracted with a reference value to judge whether the information is embedded in the pixel data while applying the geometrical deformation on the image data until it is confirmed that the information is embedded in the pixel data, wherein said embedding position check step comprises:

a roughly checking step of executing the processing of extracting from the image data at least one pixel data located at a predetermined position on the specific coordinate and comparing the data value of the pixel data thus extracted with the reference value to judge whether the information is embedded in the pixel data concerned while the geometrical deformation is applied to the image data by every first geometrical deformation rate that the information is embedded in the pixel data concerned, a detailed checking step of executing the processing of extracting from the image data at least one pixel data located at a predetermined position on the specific coordinate and comparing the data value thus extracted with the reference value to judge whether the information is embedded in the pixel data concerned while the geometrical deformation is applied to the image data by every second geometrical deformation rate smaller than the first geometrical deformation rate within a predetermined range containing the geometrical deformation rate when it is confirmed in said roughly checking step that the information is embedded in the pixel data, until it is confirmed that the information is embedded in the pixel data concerned, a restoration step of restoring the image data referring to the deformation rate when it is confirmed that the information is embedded in the pixel data in the detailed checking step, and an extraction step of extracting the information thus embedded from the image data restored in the restoration step.

2. A digital watermark information extracting method in which digital watermark information is extracted from image data which has the digital watermark information embedded therein by altering at least one pixel data located at a predetermined position on a specific coordinate and is geometrically deformed, comprising:

an embedding position check step of executing the processing of extracting at east one pixel data located at a predetermined position on the specific coordinate and comparing the data value of the pixel data thus extracted with a reference value to judge whether the information is embedded in the pixel data concerned while varying the predetermined position on the image data by deforming the specific coordinate until it is confirmed that the information is embedded in the pixel data concerned, wherein said embedding position check step comprises:

a roughly checking step of executing the processing of extracting from the image data at least one pixel data located at a predetermined position on the specific coordinate and comparing the data value of the pixel data thus extracted with the reference value to judge whether the information is embedded in the pixel data concerned while the predetermined position on the image data is varied by deforming the specific coordinate by every first deformation rate that the information is embedded in the pixel data concerned, a detailed checking step of executing the processing of extracting from the image data at least one pixel data located at a predetermined position on the specific coordinate and comparing the data value of the pixel data thus extracted with the reference value to judge whether the information is embedded in the pixel data concerned while the predetermined position on the image data is varied by deforming the specific coordinate by every second deformation rate smaller than the first deformation rate within a predetermined range containing the deformation rate when it is confirmed in said roughly checking step that the information is embedded in the pixel data concerned, a restoration step of restoring the image data referring to the deformation rate when it is confirmed that the information is embedded in the pixel data in the detailed checking step, and an extraction step of extracting the information thus embedded from the image data restored in the restoration step.

3. A storage medium for storing therein a digital watermark information extracting program for extracting digital watermark information from image data in which the digital watermark information is embedded by altering at least one pixel data located at a predetermined position on a specific coordinate and which is geometrically deformed, wherein said program when executed cause an information processor to perform:

an embedding position check step of performing the processing of extracting at least one pixel data at a predetermined position on the specific coordinate from the image data and comparing the data value of the pixel data thus extracted with a reference value to judge whether the information is embedded in the pixel data while applying the geometrical deformation on the image data until it is confirmed that the information is embedded in the pixel data, wherein said embedding position check step comprises:

a roughly checking step of executing the processing of extracting from the image data at least one pixel data located at a predetermined position on the specific coordinate and comparing the data value of the pixel data thus extracted with the reference value to judge whether the information is embedded in the pixel data concerned while the geometrical information is applied to the image data by every first geometrical deformation rate that the information is embedded in the pixel data concerned, and a detailed checking step of executing the processing of extracting from the image data at least one pixel data located at a predetermined position on the specific coordinate and comparing the data value thus extracted with the reference value to judge whether the information is embedded in the pixel data concerned while the geometrical deformation is applied to the image data by every second geometrical deformation rate smaller than the first geometrical deformation rate within a predetermined range containing the geometrical deformation rate when it is confirmed in said roughly checking step that the information is embedded in the pixel data, until it is confirmed that the information is embedded in the pixel data concerned, a restoration step of restoring the image data, referring to the deformation rate when it is confirmed that the information is embedded in the pixel data in the detailed checking step, and an extraction step of extracting the information thus embedded from the image data restored in the restoration step.

4. A storage medium for storing therein a digital watermark information extracting program for extracting digital watermark information from image data in which the digital watermark information is embedded by altering at least one pixel data located at a predetermined position on a specific coordinate and which is geometrically deformed, wherein said program when executed causes an information processor to perform:

an embedding position check step of performing the processing of extracting at least one pixel data at a predetermined position on the specific coordinate from the image data and comparing the data value of the pixel data thus extracted with a reference value to judge whether the information is embedded in the pixel data while the predetermined position on the image data is varied by deforming the specific coordinate until it is confirmed that the information is embedded in the pixel data, wherein said embedding position check step comprises:

a roughly checking step of executing the processing of extracting from the image data at least one pixel data located at a predetermined position on the specific coordinate and comparing the data value of the pixel data thus extracted with the reference value to judge whether the information is embedded in the pixel data concerned, while changing said predetermined position in the image data by effecting the deformation applied to the specific coordinate by every first deformation rate that the information is embedded in the pixel data concerned, and a detailed checking step of executing the processing of extracting from the image data at least one pixel data located at a predetermined position on the specific coordinate and comparing the data value thus extracted with the reference value to judge whether the information is embedded in the pixel data concerned while changing the predetermined position on the image data by effecting deformation applied to the image data by every second deformation rate smaller than the first deformation rate within a predetermined range containing the deformation rate when it is confirmed in said roughly checking step that the information is embedded in the pixel data, a restoration step of restoring the image data, referring to the deformation rate when it is confirmed that the information is embedded in the pixel data in the detailed checking step, and an extraction step of extracting the information thus embedded from the image data restored in the restoration step.

5. A digital watermark information extracting device for extracting digital watermark information from image data which has the digital watermark information embedded therein by altering at least one pixel data located at a predetermined position on a specific coordinate and is geometrically deformed, comprising:

means for performing the processing of extracting at least one pixel data at a predetermined, position on the specific coordinate from the image data and comparing the data value of the pixel data thus extracted with a reference value to judge whether the information is embedded in the pixel data while applying the geometrical deformation on the image data until it is confirmed that the information is embedded in the pixel data, wherein said means for performing comprises:

first means for executing the processing of extracting from the image data at least one pixel data located at a predetermined position on the specific coordinate and comparing the data value of the pixel data thus extracted with the reference value to judge whether the information is embedded in the pixel data concerned while the geometrical deformation is applied to the image data by every first geometrical deformation rate that the information is embedded in the pixel data concerned, second means for executing the processing of extracting from the image data at least one pixel data located at a predetermined position on the specific coordinate and comparing the data value thus extracted with the reference value to judge whether the information is embedded in the pixel data concerned while the geometrical deformation is applied to the image data by every second geometrical deformation rate smaller than the first geometrical deformation rate within a predetermined range containing the geometrical deformation rate when it is confirmed by said first means that the information is embedded in the pixel data, third means for restoring the image data referring to the deformation rate when it is confirmed that the information is embedded in the pixel data in said second means, and fourth means for extracting the information thus embedded from the image data restored in said third means.

6. A digital watermark information extracting device for extracting digital watermark information from image data which has the digital watermark information embedded therein by altering at least one pixel data located at a predetermined position on a specific coordinate and is geometrically deformed, comprising:

means for executing the processing of extracting at least one pixel data located at a predetermined position on the specific coordinate and comparing the data value of the pixel data thus extracted with a reference value to judge whether the information is embedded in the pixel data concerned while varying the predetermined position on the image data by deforming the specific coordinate until it is confirmed that the information is embedded in the pixel data concerned, wherein said means for executing comprises:

first means for executing the processing of extracting from the image data at least one pixel data located at a predetermined position on the specific coordinate and comparing the data value of the pixel data thus extracted with the reference value to judge whether the information is embedded in the pixel data concerned, while changing said predetermined position in the image data by effecting the deformation applied to the specific coordinate by every first deformation rate that the information is embedded in the pixel data concerned, second means for executing the processing of extracting from the image data at least one pixel data located at a predetermined position on the specific coordinate and comparing the data value thus extracted with the reference value to judge whether the information is embedded in the pixel data concerned while changing the predetermined position on the image data by effecting deformation applied to the image data by every second deformation rate smaller than the first deformation rate within a predetermined range containing the deformation rate when it is confirmed in said first means that the information is embedded in the pixel data, third means for restoring the image data referring to the deformation rate when it is confirmed that the information is embedded in the pixel data in said second means, and fourth means for extracting the information thus embedded from the image data restored in said third means.

* * * * *